(12) United States Patent
Mossman et al.

(10) Patent No.: US 6,789,587 B2
(45) Date of Patent: Sep. 14, 2004

(54) METHOD AND APPARATUS FOR UNDERWATER TREE CUTTING AND RETRIEVAL

(75) Inventors: Stewart A. Mossman, Mesachie Lake (CA); Forest G. Metsker, Cove, OR (US)

(73) Assignee: Triton Logging Company Inc., Victoria (CA)

( * ) Notice: Subject to any disclaimer, the term of this patent is extended or adjusted under 35 U.S.C. 154(b) by 207 days.

(21) Appl. No.: 09/906,959

(22) Filed: Jul. 16, 2001

(65) Prior Publication Data

US 2003/0010404 A1 Jan. 16, 2003

(30) Foreign Application Priority Data

Jul. 13, 2001 (CA) .............................................. 2353069

(51) Int. Cl.⁷ .......................... A01G 23/08; B23Q 15/00
(52) U.S. Cl. .......................... 144/4.1; 114/52; 114/315; 114/333; 83/483; 83/360; 144/34.1; 144/335; 144/336; 144/356; 144/382
(58) Field of Search ............................. 251/323; 114/52, 114/54, 333, 315; 144/4.1, 34.1, 335, 336, 356, 357, 382; 83/483, 360, 370

(56) References Cited

U.S. PATENT DOCUMENTS

| | | | |
|---|---|---|---|
| 1,946,390 A | * | 2/1934 | Christiansen |
| 3,693,676 A | | 9/1972 | Burch |
| 3,710,746 A | | 1/1973 | Mcdonald |
| 3,719,116 A | | 3/1973 | Burton et al. |
| 4,258,763 A | | 3/1981 | Figueredo et al. |
| 4,507,093 A | | 3/1985 | Norvell |
| 4,510,878 A | | 4/1985 | Breedlove |
| 4,679,604 A | | 7/1987 | Howeth |
| 4,802,517 A | | 2/1989 | Laster |
| 4,953,295 A | | 9/1990 | Barradas et al. |
| 5,042,959 A | | 8/1991 | Tadatsu |
| 5,107,594 A | | 4/1992 | Ferreras |
| 5,361,748 A | | 11/1994 | Matteucci |
| 5,613,537 A | | 3/1997 | Gassiott |
| 5,655,584 A | | 8/1997 | Glawson |
| 5,755,172 A | * | 5/1998 | Fryburg ....................... 114/52 |
| 5,868,182 A | | 2/1999 | Burton |
| 6,024,145 A | | 2/2000 | Ackles |

FOREIGN PATENT DOCUMENTS

| | | |
|---|---|---|
| CA | 1 127 014 | 7/1982 |
| CA | 2201828 | 10/1997 |
| EP | 0 540 834 A1 | 5/1993 |

(List continued on next page.)

*Primary Examiner*—W. Donald Bray
(74) *Attorney, Agent, or Firm*—Oyen Wiggs Green & Mutala

(57) ABSTRACT

The invention relates to an apparatus and method for cutting submerged trees at an underwater logging site and for retrieving the cut trees. Once cut, each tree is retrieved to the water surface by an inflatable bag deployed from and inflated by the apparatus. The apparatus includes a control unit positioned on a surface vessel, such as a barge or large boat, and an underwater vessel connected together by an umbilical. Preferably the underwater vessel is a remotely controllable submersible including a grapple for releasably holding each tree to be cut, a saw, a gas supply connectable to a gas source located on the surface vessel, and an air bag deployment and inflation assembly for inflating the air bag and securely attaching it to the tree. The underwater vessel is initially loaded with a plurality of air bags which are stored in a magazine located in the interior of the vessel. The air bags are sequentially moved from the magazine on to an ejection track at a front end of the vessel disposed above the saw and grapple. Each air bag is secured to a cartridge for coupling the bag to the magazine and the ejection track and for holding a tree fastener. In its uninflated state, the air bag is contained within a tubular housing which is releasably connectable to the cartridge. The housing is ejected from the cartridge when the air bag is inflated and deployed.

64 Claims, 44 Drawing Sheets

FOREIGN PATENT DOCUMENTS

| | | |
|---|---|---|
| EP | 0 652 066 A1 | 10/1994 |
| GB | 1 568 687 | 6/1980 |
| GB | 2 045 693 | 11/1980 |
| GB | 2 131 749 A | 6/1984 |
| GB | 2 133 353 A | 7/1984 |
| RU | 477088 | 7/1976 |
| RU | 2032606 | 4/1995 |
| SE | 7707111 | 1/1979 |

* cited by examiner

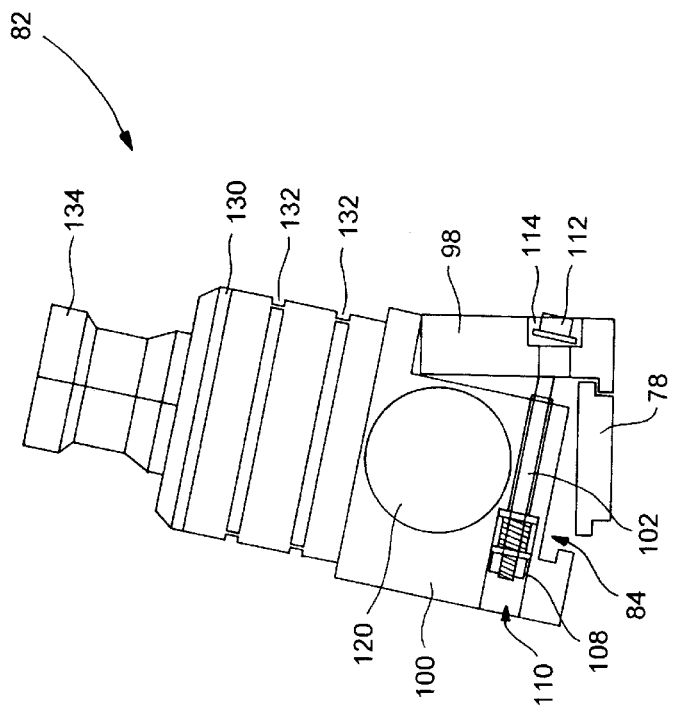
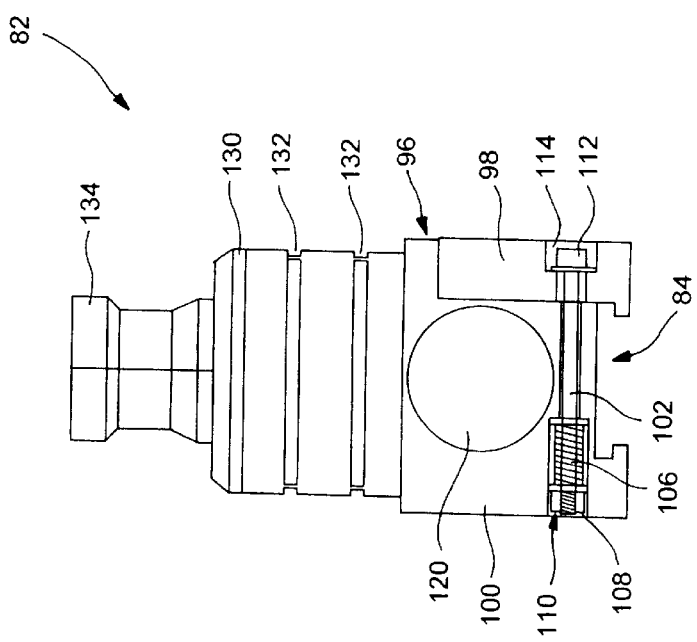
FIG. 22
FIG. 23

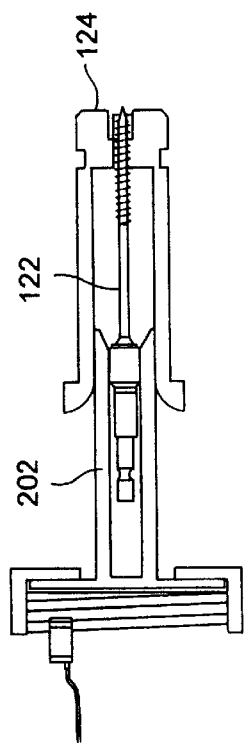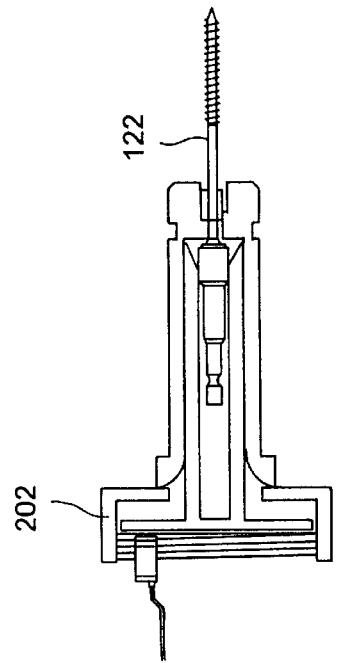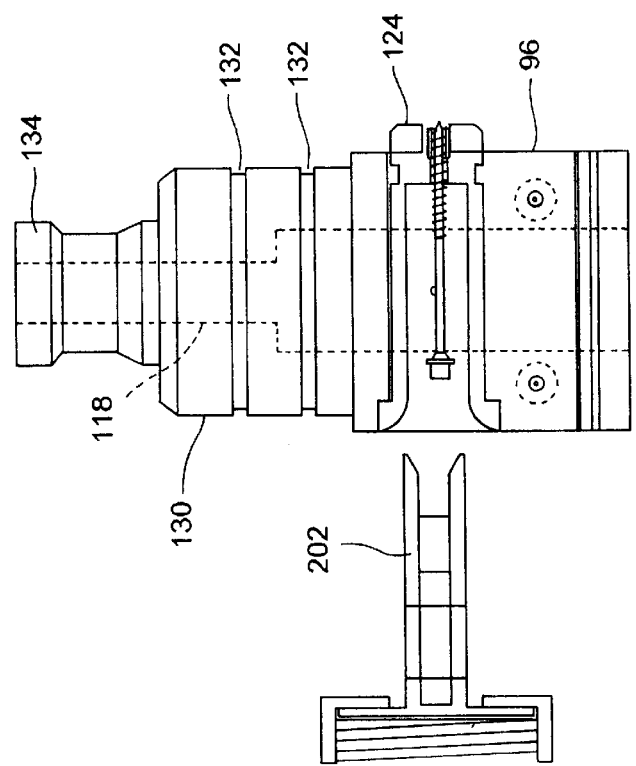

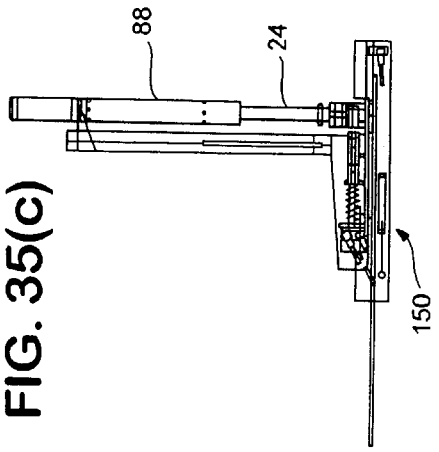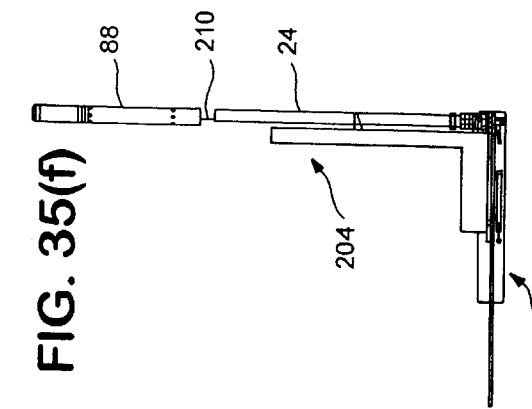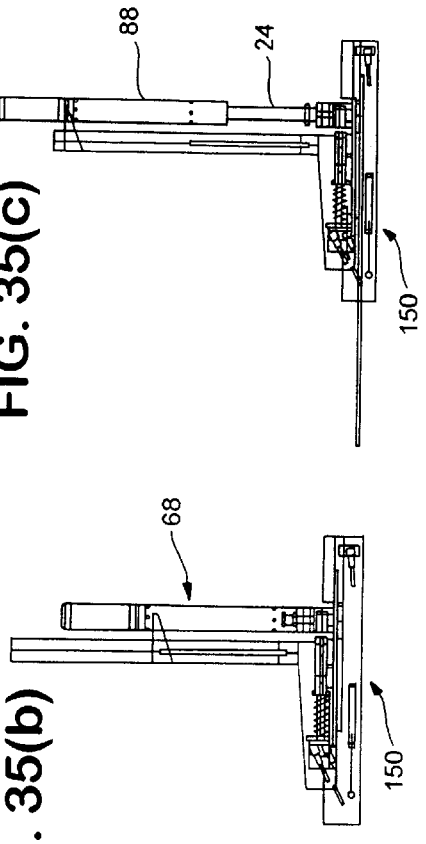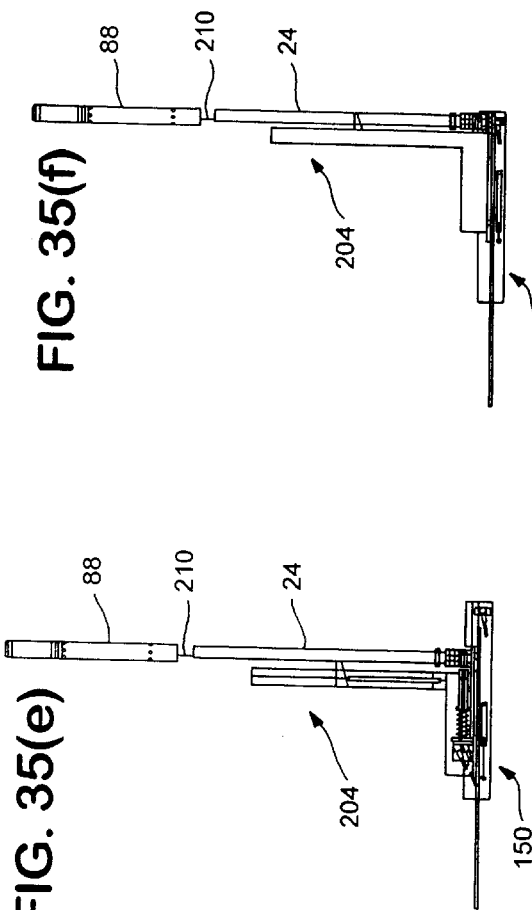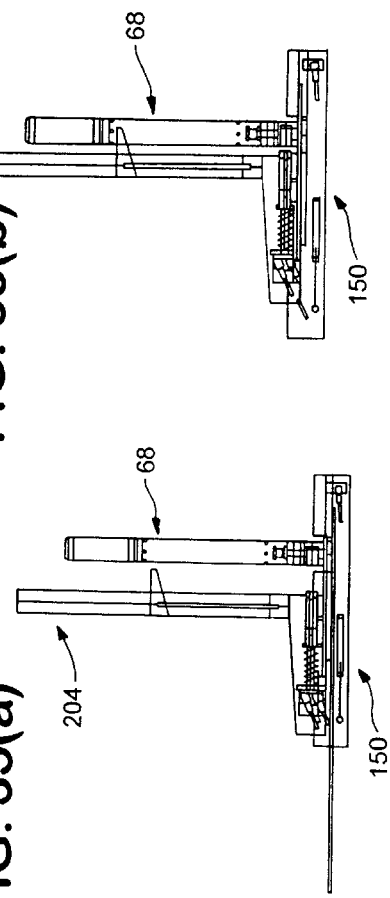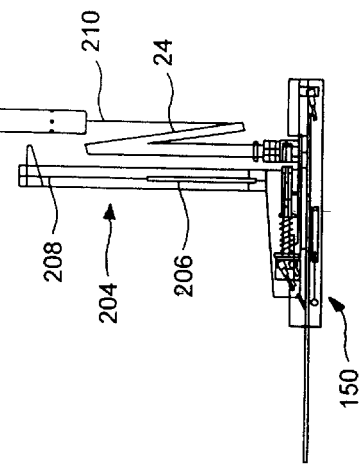

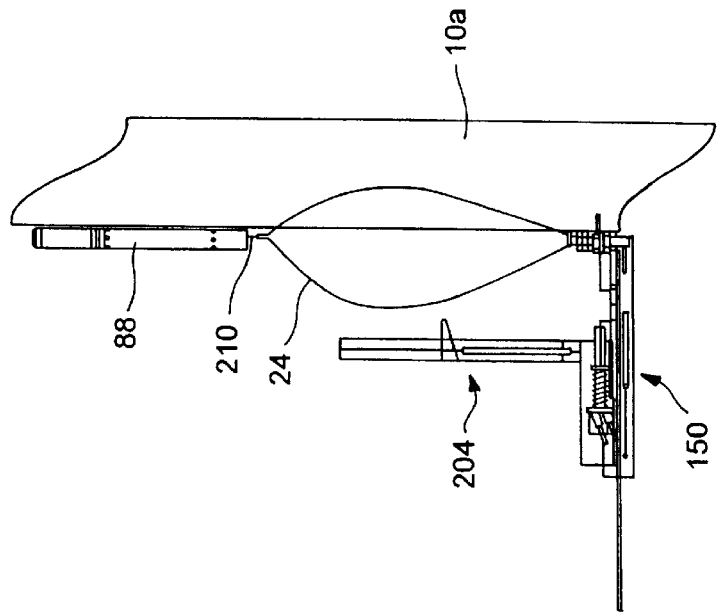
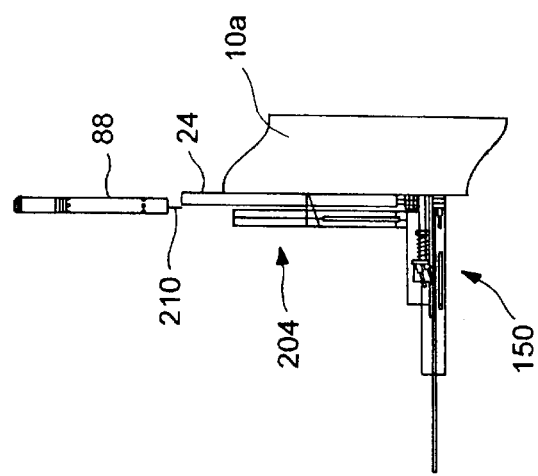
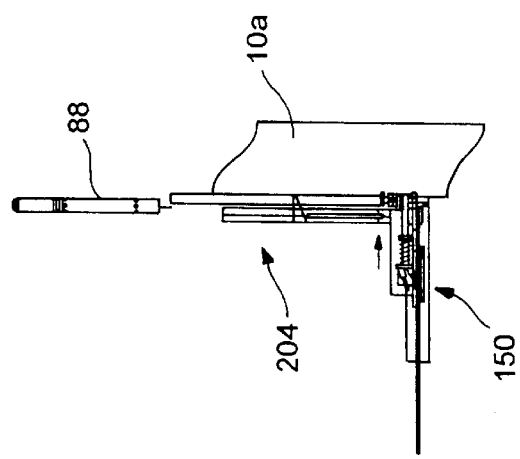
FIG. 35(i)
FIG. 35(h)
FIG. 35(g)

METHOD AND APPARATUS FOR UNDERWATER TREE CUTTING AND RETRIEVAL

TECHNICAL FIELD

This invention pertains to a method and apparatus for cutting and retrieving submerged trees.

BACKGROUND

Forested valleys can become flooded by natural causes or by hydroelectric damming. This results in free standing trees becoming submerged. It is desirable to harvest these submerged trees for commercial use.

It is known to provide a vessel, such as a barge, for floating on the surface of the water, with a mounted boom capable of extending under the water surface to cut underwater trees or stumps. Such apparatuses are described, for example, in U.S. Pat. No. 5,613,537, issued to Gassiott and U.S. Pat. No. 5,655,584, issued to Glawson. U.S. Pat. No. 6,024,145, issued to Ackles describes an articulated boom mounted to a free floating platform for use in manipulating objects under water. Such apparatuses are, however, limited to water depths equal to or less than the length of the boom. Such apparatuses are not effective in harvesting trees submerged in great depths of water.

U.S. Pat. No. 3,719,116, issued to Burton et al. describes an "Underwater Saw for Tree and Stump Removal". An underwater component is connected to a surface vessel by a flexible umbilical connection. The underwater component has hydraulically-operated propellers for depth control and has a pair of front-mounted horizontal saw blades to cut submerged trees and stumps. This apparatus does not contemplate any means to retrieve the cut trees other than allowing them to float to the surface. However, some submerged trees become waterlogged, and thus will not rise to the water surface on their own.

U.S. Pat. No. 5,868,182, issued to Burton describes a "Submersible Logging Device" having a frame with two traction wheels for moving along the bottom surface of the body of water. The frame has a sawing apparatus in an intermediate portion of the frame for cutting adjacent free standing timber. The frame also includes a "dogging device" for fastening a line to the cut tree for retrieval thereof to the surface.

It is apparent that prior art underwater logging systems suffer from serious shortcomings, particularly in the case of trees submerged at great depths. The need has therefore arisen for a method and apparatus for cutting and retrieving submerged trees which employs air bags deployed and inflated by a remotely operated vehicle for raising cut trees to the water surface.

SUMMARY OF INVENTION

This invention provides an apparatus that allows for the harvesting of submerged trees at increased water depths. The apparatus can cut submerged trees and retrieve the trees to the surface of the water. The apparatus includes a control unit positionable on a surface vessel, such as a barge, and an underwater vessel, such as a ROV, remotely controllable from the control unit. The control unit and underwater vessel may be operatively connected with an umbilical. The underwater vessel preferably includes a propulsion system for navigating the vessel under water, a grapple for releasably engaging one of the trees, a plurality of buoyant members sequentially ejectable from the underwater vessel, each of the members being attachable to one of the trees, and a saw for cutting the trees.

In one embodiment of the invention each of the buoyant members may comprise a cartridge having a gas inlet, a gas outlet and a gas passageway extending between the inlet and outlet; an inflatable bag coupled to the cartridge for receiving gas discharged from the gas outlet, the bag being adjustable between inflated and uninflated states; and a housing releasably connectable to the cartridge for containing the inflatable bag in the uninflated state. The housing includes a sealable chamber for containing a buoyant material. The buoyancy of the sealable chamber is adjustable to alter the buoyancy characteristics of the housing. Preferably the underwater vessel is "buoyancy neutral" meaning that the ejection of buoyant members from the vessel does not substantially affect the buoyancy characteristics of the vessel. The housing may also comprise a filament for tethering the housing to the bag.

The underwater vessel may further include a magazine located within the underwater vessel for holding a plurality of the buoyant members. Each of the buoyant members is movable between a storage position in the magazine and a deployed position proximate one of the trees. An ejection track is located at a front end of the underwater vessel above the saw for transferring each of the buoyant members from the storage position to the deployed position. In one embodiment, the magazine may comprise a track; a chain drive moveable around the track; and a plurality of magazine rails extending upwardly from the chain drive at spaced intervals. An indexer controllable from the control unit is provided for advancing the chain drive around the track in predetermined increments as each buoyant member is ejected. Each of the cartridges has a slot formed in a base portion thereof for receiving one of the magazine rails. The ejection track may include a shuttle moveable between a loading position proximate the magazine and a deployed position proximate one of the trees, the shuttle having a shuttle rail alignable with one of the magazine rails to enable sliding movement of one of the cartridges from the magazine on to the shuttle in the loading position. The shuttle rail has an aperture extending therethrough which is alignable with the gas inlet of a cartridge loaded on the shuttle.

The apparatus further includes a cartridge advancement assembly on the underwater vessel for actuating sliding movement of a cartridge from the magazine on to the shuttle when the shuttle is in the loading position. A shuttle actuator is also provided for actuating movement of the shuttle between the loading and deployed positions. A housing ejector is disposed proximate to the ejection track for ejecting the housing from the cartridge loaded on the shuttle to enable inflation of the inflatable bag. Each inflatable bag is inflated on the underwater vessel from a gas supply.

The grapple is disposed below the saw at a front end of the underwater vessel, the grapple comprising a central grapple frame and a pair of grapple arms each pivotably coupled to the frame, wherein the grapple arms are movable between an open position for receiving one of the trees therebetween and a closed position embracing the tree. An extraction ram is provided for advancing the grapple frame forwardly between a retracted position and an extended position. The extraction ram may be actuated, for example, when the saw becomes stuck in a tree during the cutting operation.

The invention also relates to a method of cutting and retrieving a tree submerged underneath the surface of a water body comprising the steps of:

(a) providing a remotely controlled underwater vessel, wherein the vessel carries at least one inflatable bag;

(b) releasably engaging the underwater vessel to the tree;

(c) fastening the inflatable bag to the tree;

(d) inflating the inflatable bag;

(e) cutting the tree at a location below the inflatable bag; and (f) disengaging the underwater vessel from the tree to allow the tree and the inflatable bag to rise together to the surface of the water body for retrieval.

Preferably the underwater vessel is operatively coupled to a surface vessel located on the surface of the body of water and the step of inflating the inflatable bag comprises delivering gas from a gas supply on the surface vessel to the underwater vessel.

The various steps of the method are remotely controlled by an operator on the surface vessel. In order to facilitate such remote control, the method includes the steps of transmitting position signals from the underwater vessel to the surface vessel through the umbilical indicative of the position of the underwater vessel relative to a tree; and processing the signals on the surface vessel to generate a visual display viewable by the operator showing the position of the underwater vessel.

Additional features and advantages of the invention are described in detail below.

BRIEF DESCRIPTION OF DRAWINGS

In the drawings which are illustrative only and should not be construed as limiting the scope of the invention:

FIG. 21b is a side elevational view of one side portion of the indexer of FIG. 21a.

FIG. 22 is a front elevational view of an air bag cylinder cartridge.

FIG. 23 is a cross-sectional view of the cartridge of FIG. 22 showing a spring-loaded fastener for coupling together portions of the cartridge base.

FIG. 28(a)–(d) are side elevational views showing steps for inserting a tree fastener into a tree using a screw driving tool insertable into the cartridge.

FIGS. 35a–35h are side elevational views illustrating the sequence of air bag deployment and inflation steps actuated by the assembly of FIGS. 30–34.

In the drawings like reference characters indicate corresponding parts in the different Figures.

Description

Figure 1:
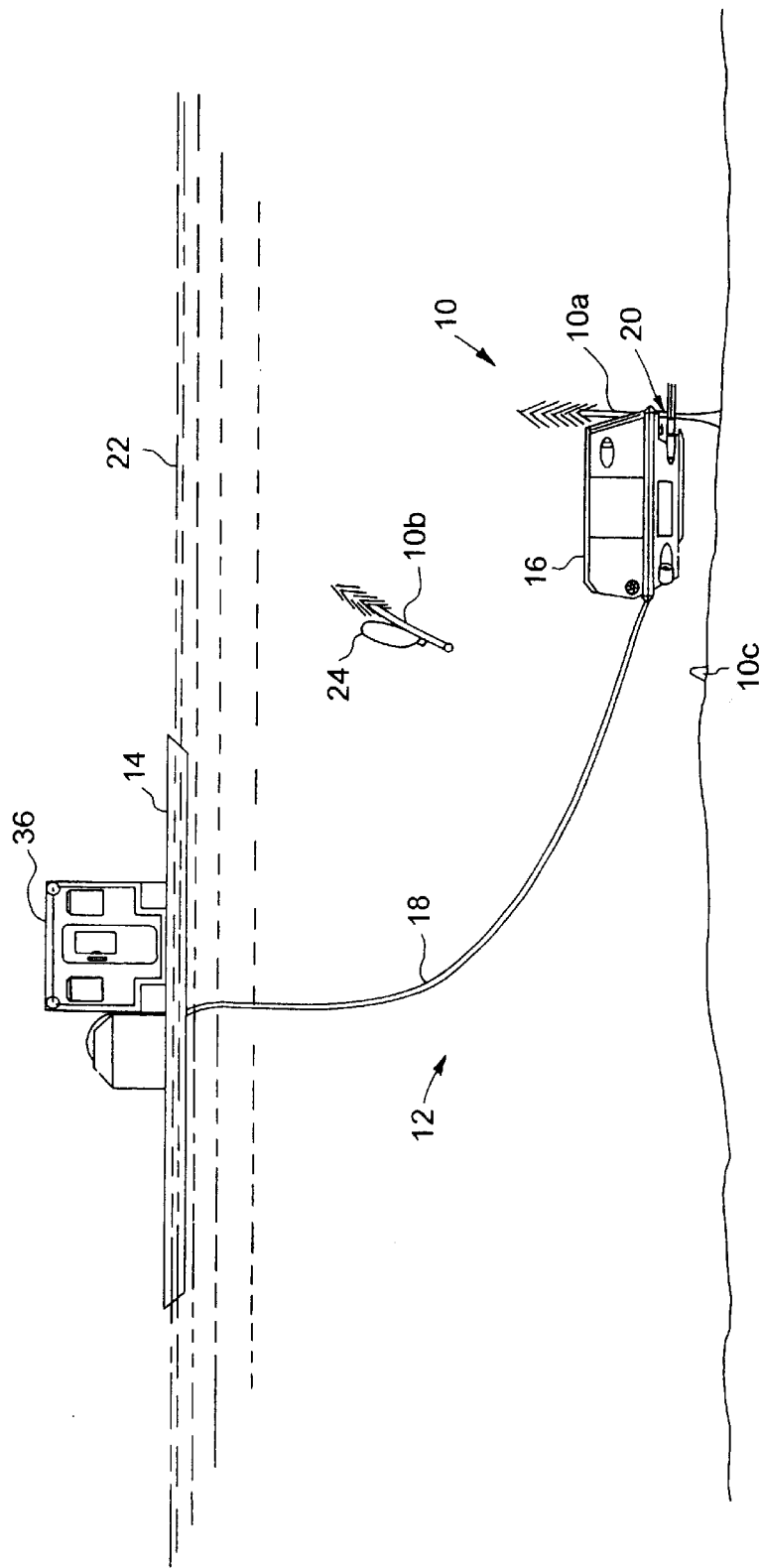
FIG. 1 is a pictorial view of the apparatus of the invention showing the underwater vessel engaging a submerged tree.

FIG. 1 illustrates generally the method and apparatus developed by the Applicant for cutting and retrieving submerged trees 10. The apparatus 12 of the invention includes a surface vessel 14, such as a barge or large boat, and an underwater vessel 16 connected together by an umbilical 18. FIG. 1 shows underwater vessel 16 engaging a submerged, free-standing tree 10a in the first step of the harvesting procedure. A second tree 10b is also illustrated in FIG. 1. As described in detail below, tree 10b has been previously cut by a saw 20 mounted on underwater vessel 16, leaving a tree stump 10c. The cut tree 10b is being retrieved to the water surface 22 through the use of an air bag 24 deployed from and inflated by underwater vessel 16.

Structure

Figure 2:
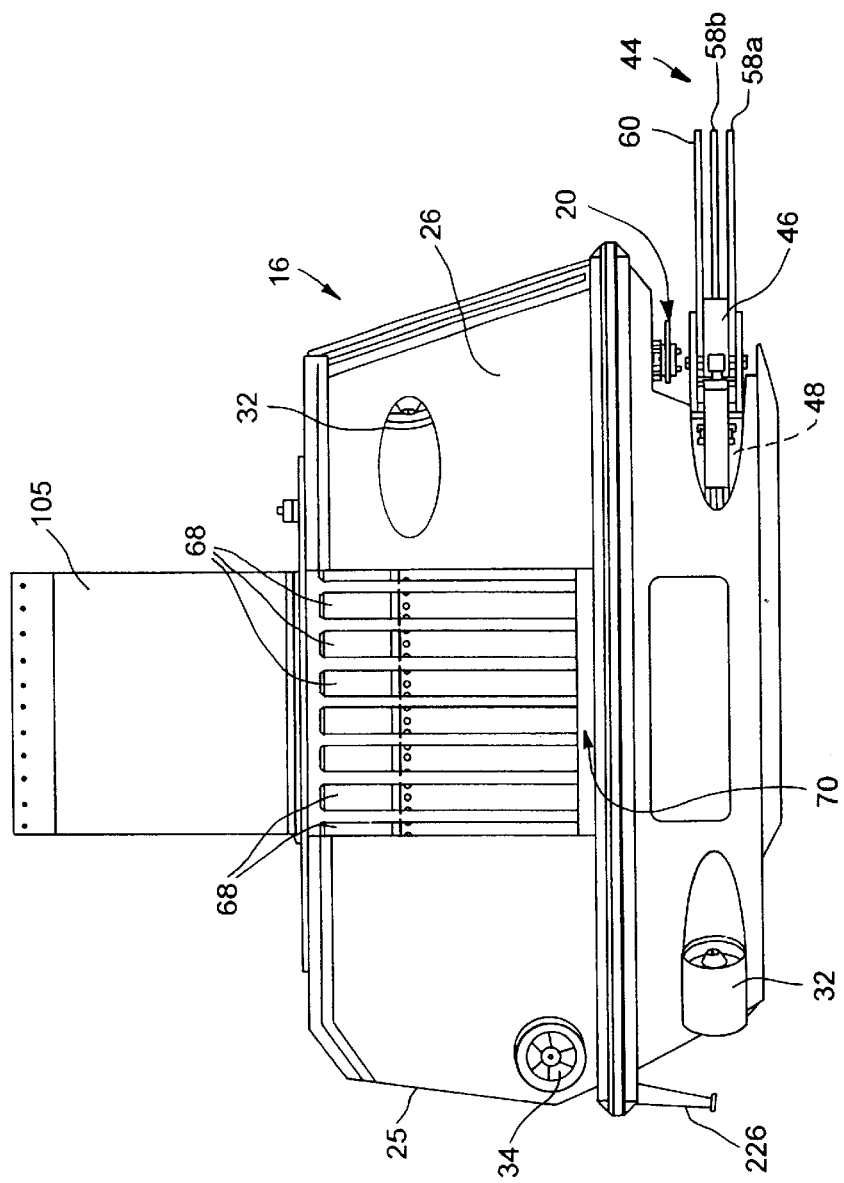
FIG. 2 is a side elevational view of the underwater vessel with one magazine access door hinged open.
Figure 3A:
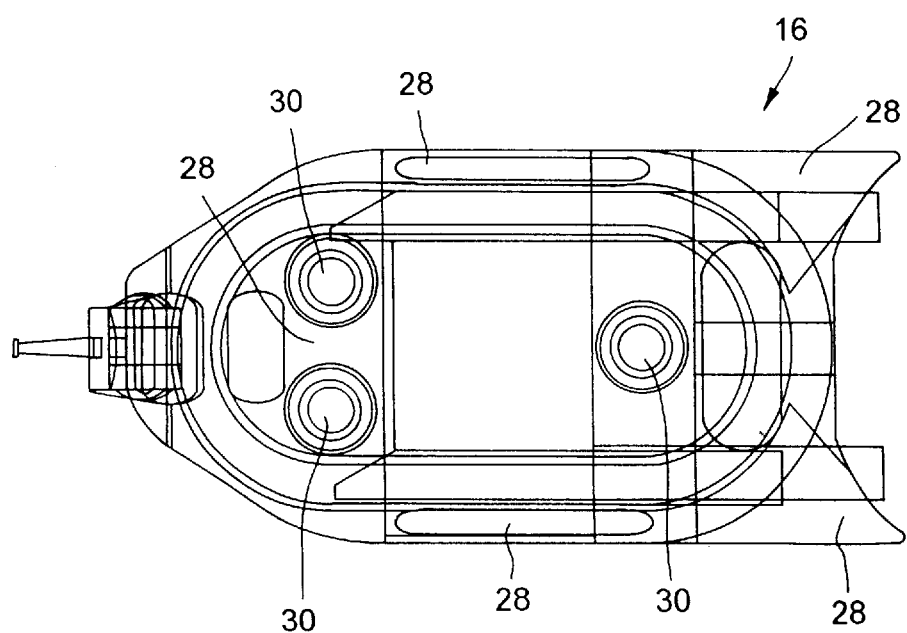
FIG. 3a is a top plan view of the underwater vessel of FIG. 2 showing the position of float cells.
Figure 3B:
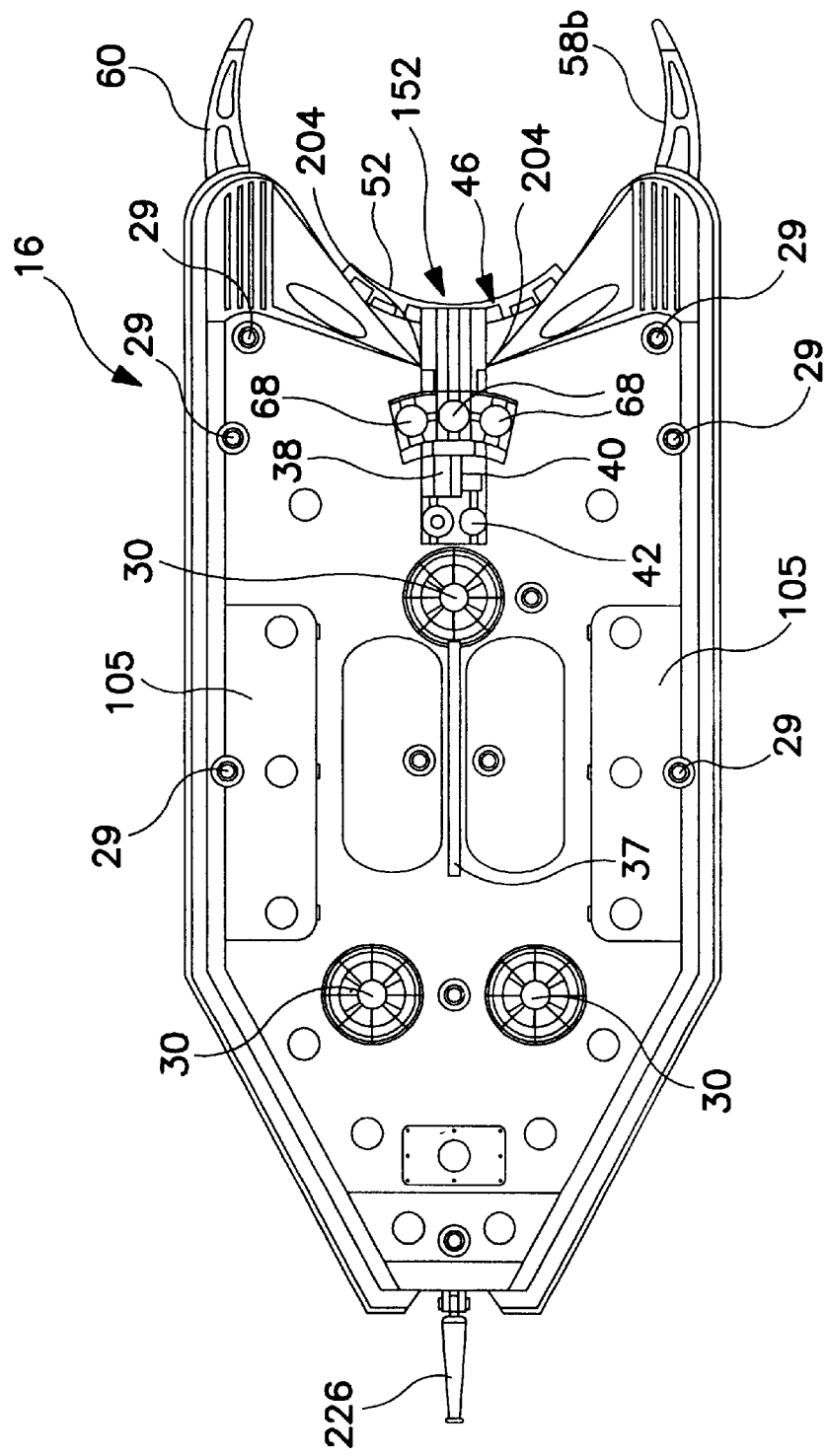
FIG. 3b is a top plan view of the underwater vessel of FIG. 2.
Figure 4:
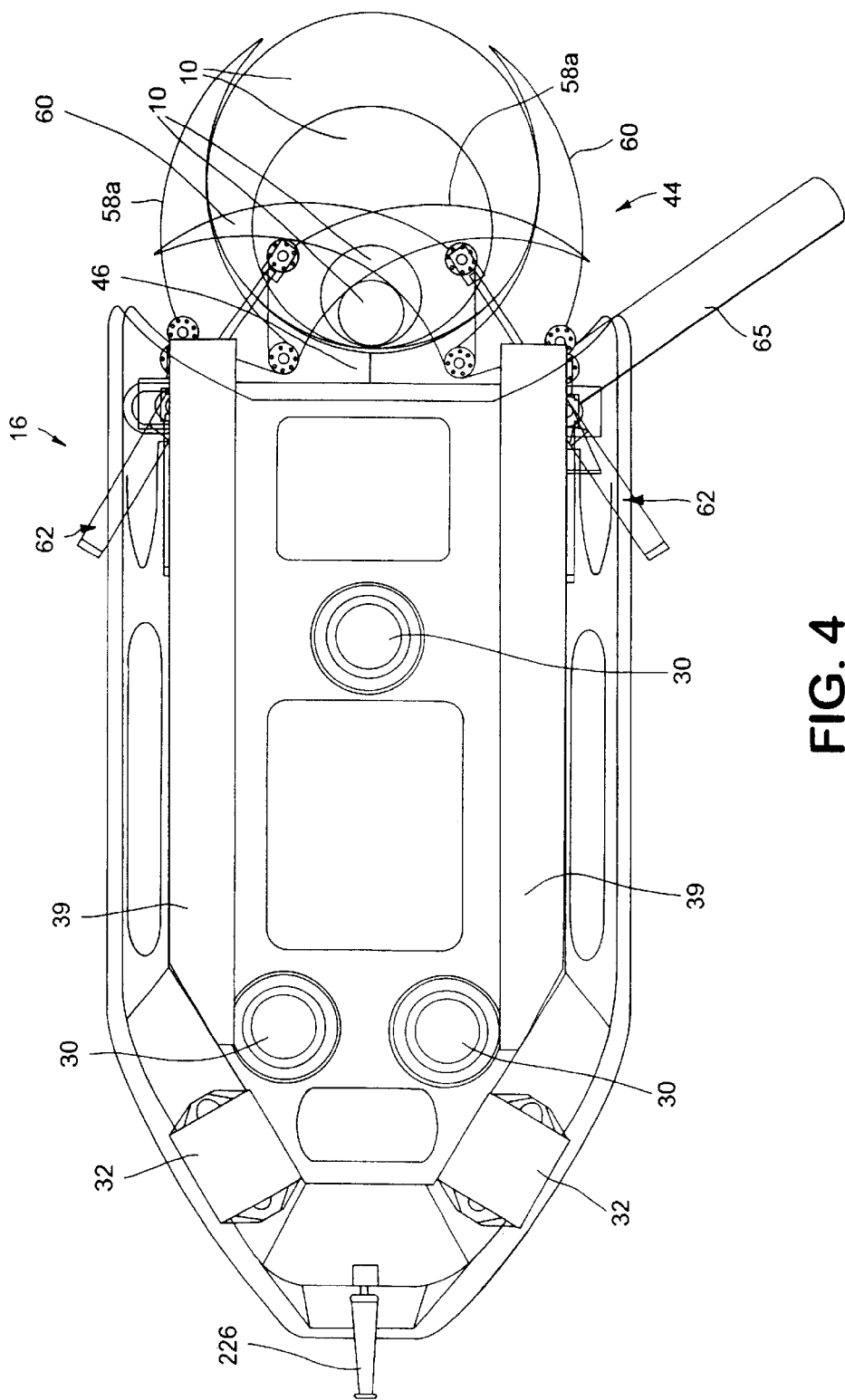
FIG. 4 is a bottom plan view of the underwater vessel.

Referring to FIGS. 2–4, underwater vessel 16 is a remotely operated vehicle (ROV) having a rigid housing 25 covered by an exterior shell 26 preferably made from plastic-coated aluminum or fiberglass. As shown in FIG. 3a, shell 26 encloses a plurality of float cells 28 comprised of polyurethane foam. As shown in FIG. 3b, foam is injected into the interior of vessel 16 through foam injection ports 29 to form float cells 28. Float cells 28 are disposed at different locations within vessel 16 (for example, in front and rear flotation chambers and side access doors) to ensure that underwater vessel 16 is "buoyancy neutral", meaning that vessel 16 will not rise or fall within the water when its propulsion system described below is inactive. The density of the encapsulated foam may vary at different locations within underwater vessel 16 to compensate for the weight distribution of its component parts, thereby maintaining the neutral buoyancy.

Figure 5:
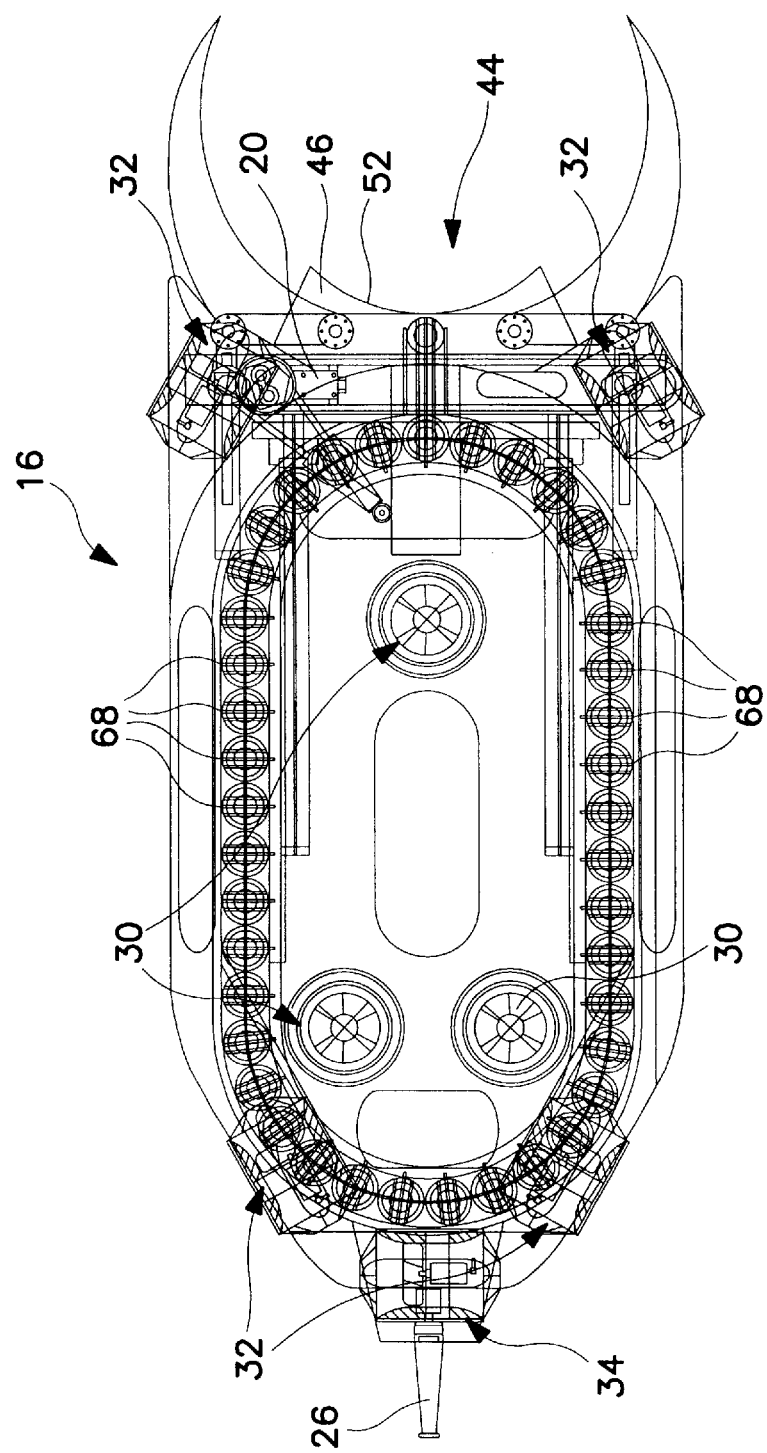
FIG. 5 is a top plan view of the underwater vessel showing the multi-thruster propulsion system.

As shown best in FIG. 5, underwater vessel 16 has a remotely controllable propulsion system to move vertically, laterally and rotationally within the water. Vertical movement is effected by vertical thrusters 30, axial (i.e. forward and rearward) movement is effected by axial vector thrusters 32, and rotational movement is effected by an aft lateral thruster 34. In one embodiment of the invention, each thruster 30–34 may be driven by a separate motor. Since vessel 16 is primarily designed for operation in fresh water lakes and reservoirs, and hence the drag on umbilical 18 by water currents is small as compared to tidal currents encountered in the open ocean, relatively small, energy efficient thrusters 30–34 may be employed. By way of example only, conventional marine hydraulic thrusters 30–34 may be used which produce 5 horsepower and 150 pounds of static thrust at 2500 psi (1043 rpm).

Underwater vessel 16 is remotely operable by an operator located in a control unit 36 mounted on surface vessel 14. Since vessel 16 is intended to operate in extreme conditions within submerged forests and the like, optimum maneuverability of vessel 16 is essential to avoid snagging. As shown in FIG. 3b and as described in further detail below, vessel 16 may include one or more video cameras 38 mounted on its upper front portion. The video signal from each camera 38 is transmitted through umbilical 18 to control unit 36 where the operator can visually monitor the position of underwater vessel 16 within the water. Lights 40 are also mounted on underwater vessel 16 to improve the quality of the video feed. Both video cameras 38 and lights 40 have infrared capabilities for use at night or in deep water conditions having little or no ambient light. Underwater vessel 16 is also equipped with a sonar 42, mounted beside a video camera 38 (FIG. 3b). Sonar information is fed to control unit 36 through umbilical 18 to assist the operator in conditions with poor visibility, such as, for example, when there is disruption of the silt on the bottom surface of the water body or when visibility is obstructed by debris from trees 10.

Both underwater vessel 16 and control unit 36 are compact in size to enable convenient transport to and from remote locations by ground transport, boat or helicopter. By way of example, the overall dimensions of underwater vessel 16 may be approximately 13'×5.5'×7' and the overall dimensions of control unit 36 may be approximately 7'×6'× 6'. Vessel 16 may be raised or lowered by a lift bar 37 mounted on its upper surface.

Figure 6:
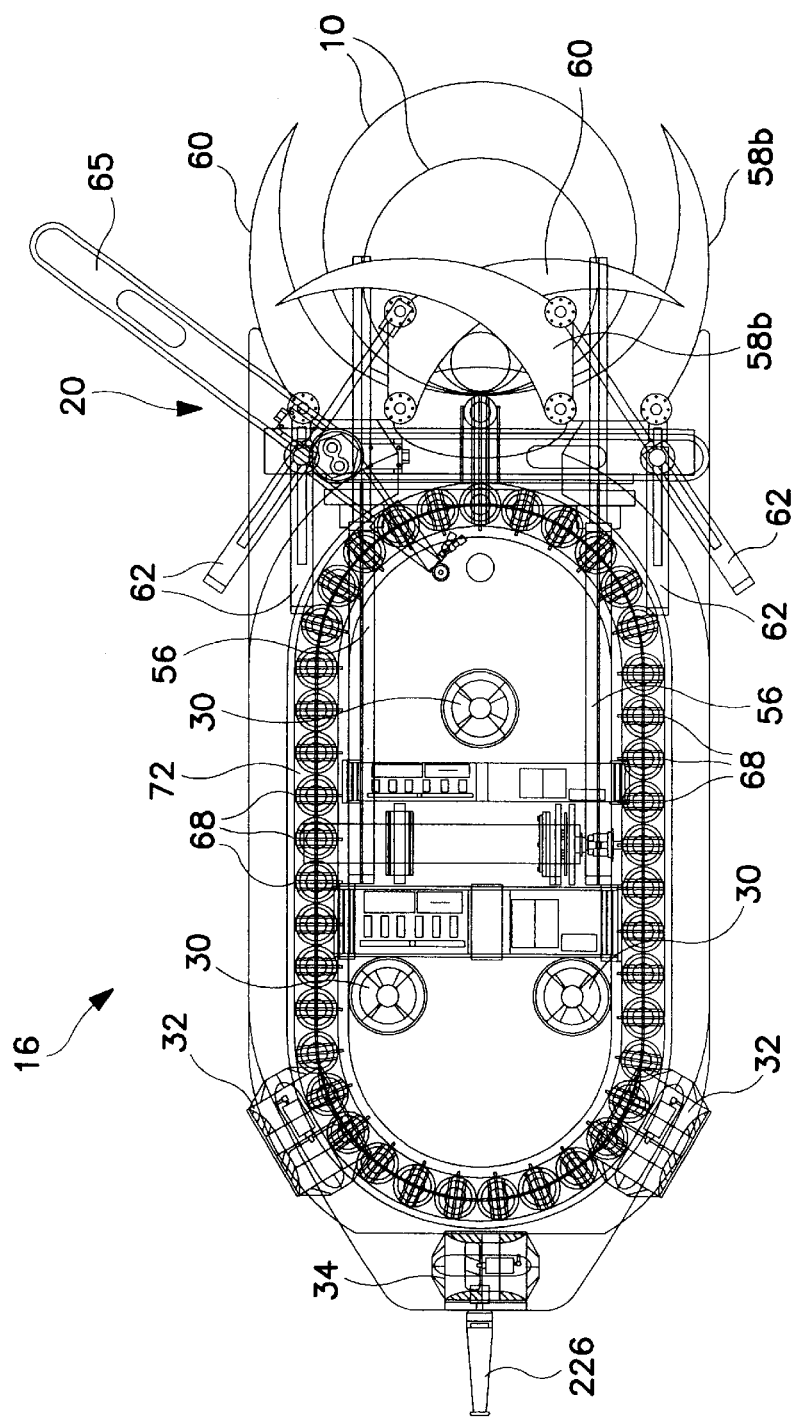
FIG. 6 is a top plan view of the underwater vessel with the top cut away showing the internal air bag cylinder magazine and the position of the grapple assembly.
Figure 7:
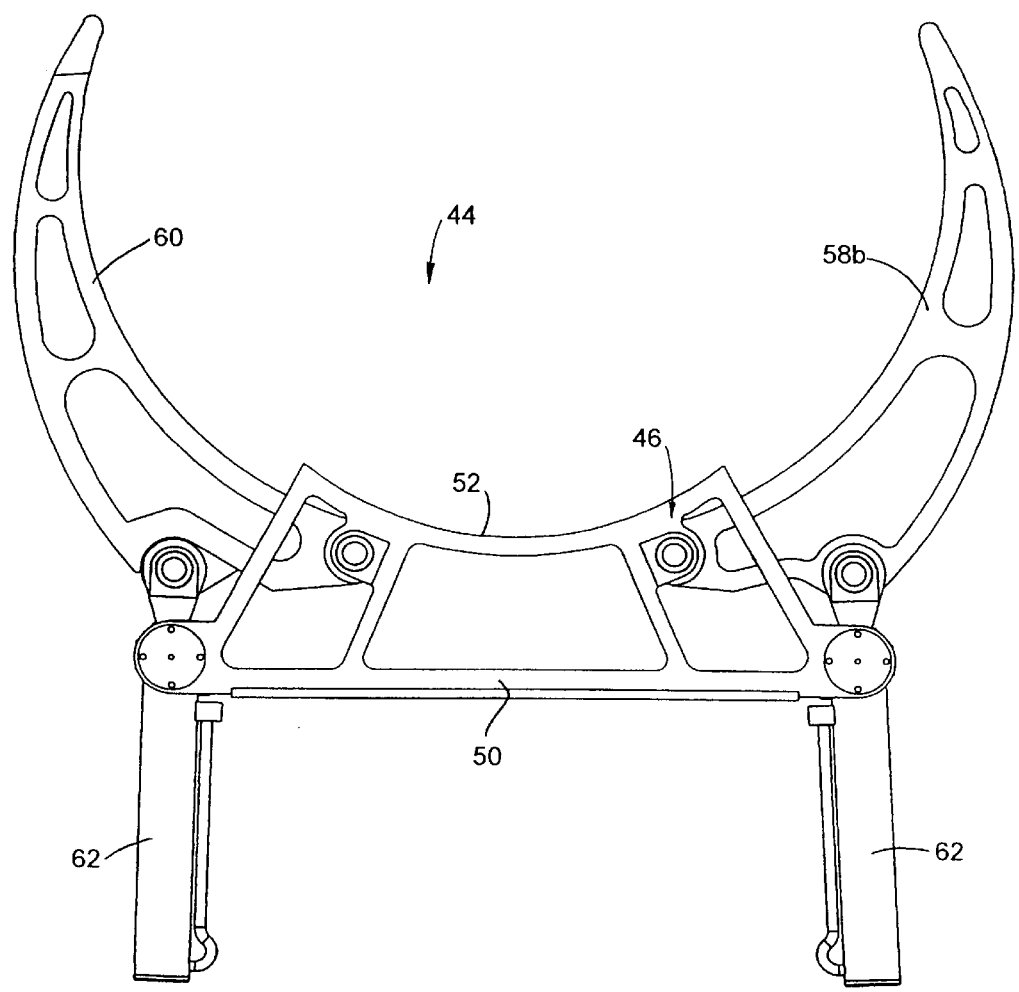
FIG. 7 is a top plan view of the grapple assembly.

As shown in FIGS. 2–11, a grapple assembly 44 is mounted at a front end of vessel 16 for grappling a submerged tree 10a. Grapple assembly 44 includes a central grapple frame 46 which is mounted to vessel housing 25 within a recess 48 located in a lower front portion of vessel 16 (FIG. 2). Grapple frame 46 may be constructed out of steel, aluminum or any other suitably rigid material and includes a linear rear surface 50 and an outwardly concave front surface 52 for conforming to the curvature of a tree 10a (FIG. 7). As shown best in FIG. 9, a pair of hydraulically driven reciprocating rods 54 are coupled to rear surface 50 of grapple frame 46 for actuating axial (forward and rearward) movement of grapple assembly 44 to disengage underwater vessel 16 from tree 10 in the event of saw malfunction (as discussed further below). Rods 54 are driven by hydraulic rams 56 mounted on an undersurface of housing 25 near the front end of vessel 16.

Figure 8:
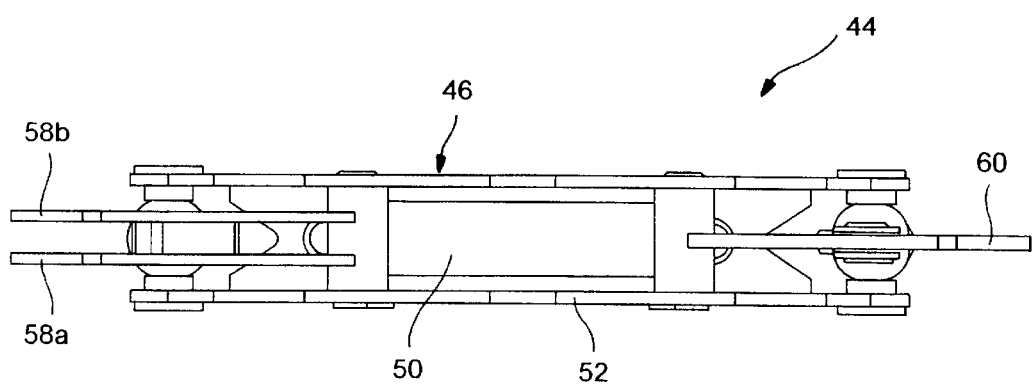
FIG. 8 is a front elevational view of the grapple assembly of FIG. 7.

Grapple assembly 44 further includes a pair of curved grapple arms 58 and 60 which are pivotably coupled to grapple frame 46 on opposite sides thereof. Pivoting movement of each grapple arm 58, 60 is driven by a corresponding hydraulic ram 62 mounted on vessel housing 25. As shown in FIGS. 4 and 6, extension of hydraulic rams 62 causes grapple arms 58, 60 to pivot inwardly to capture a submerged tree 10 therebetween. In the illustrated embodiment, right grapple arm 58 is comprised of two plates 58a and 58b extending in parallel horizontal planes (FIG. 8). Left grapple arm 60 is comprised of a single horizontally extending plate to compensate for the weight of saw 20 which is mounted at the front end of underwater vessel 16 immediately above left grapple arm 60.

Figure 12:
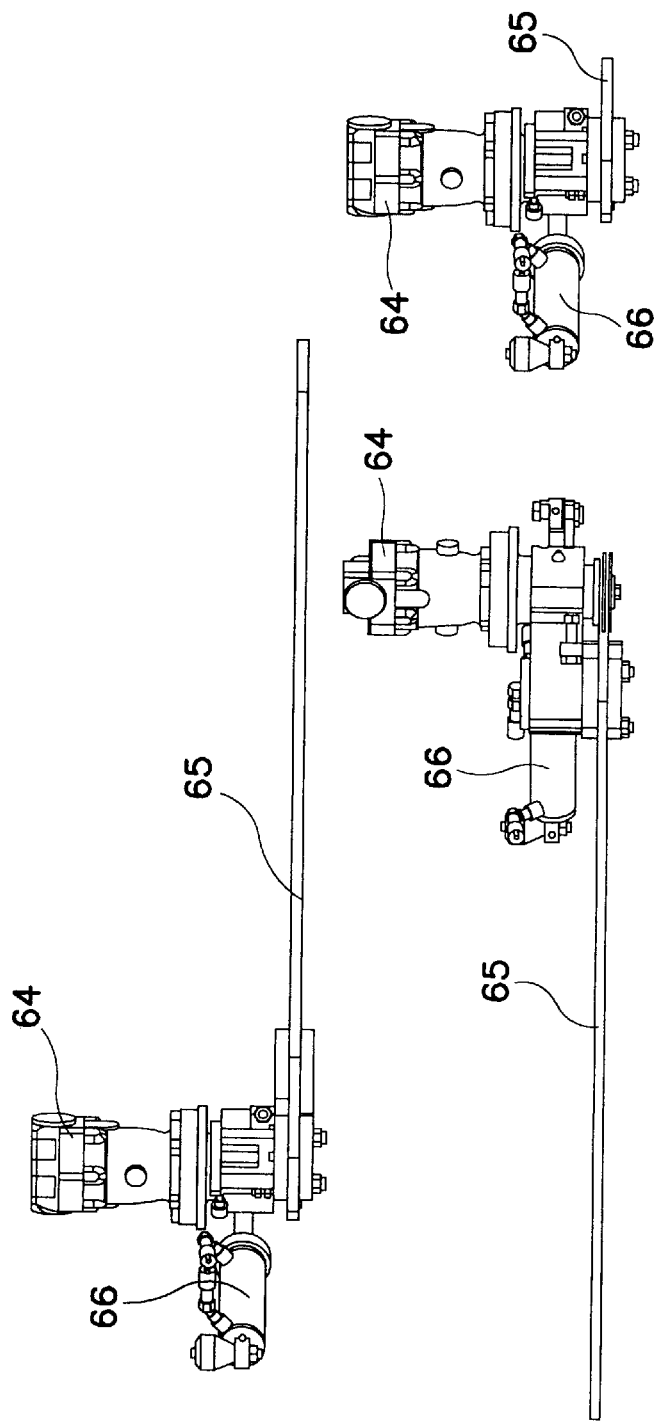
FIG. 12 is a further side elevational view of the saw assembly in isolation.
Figure 13:
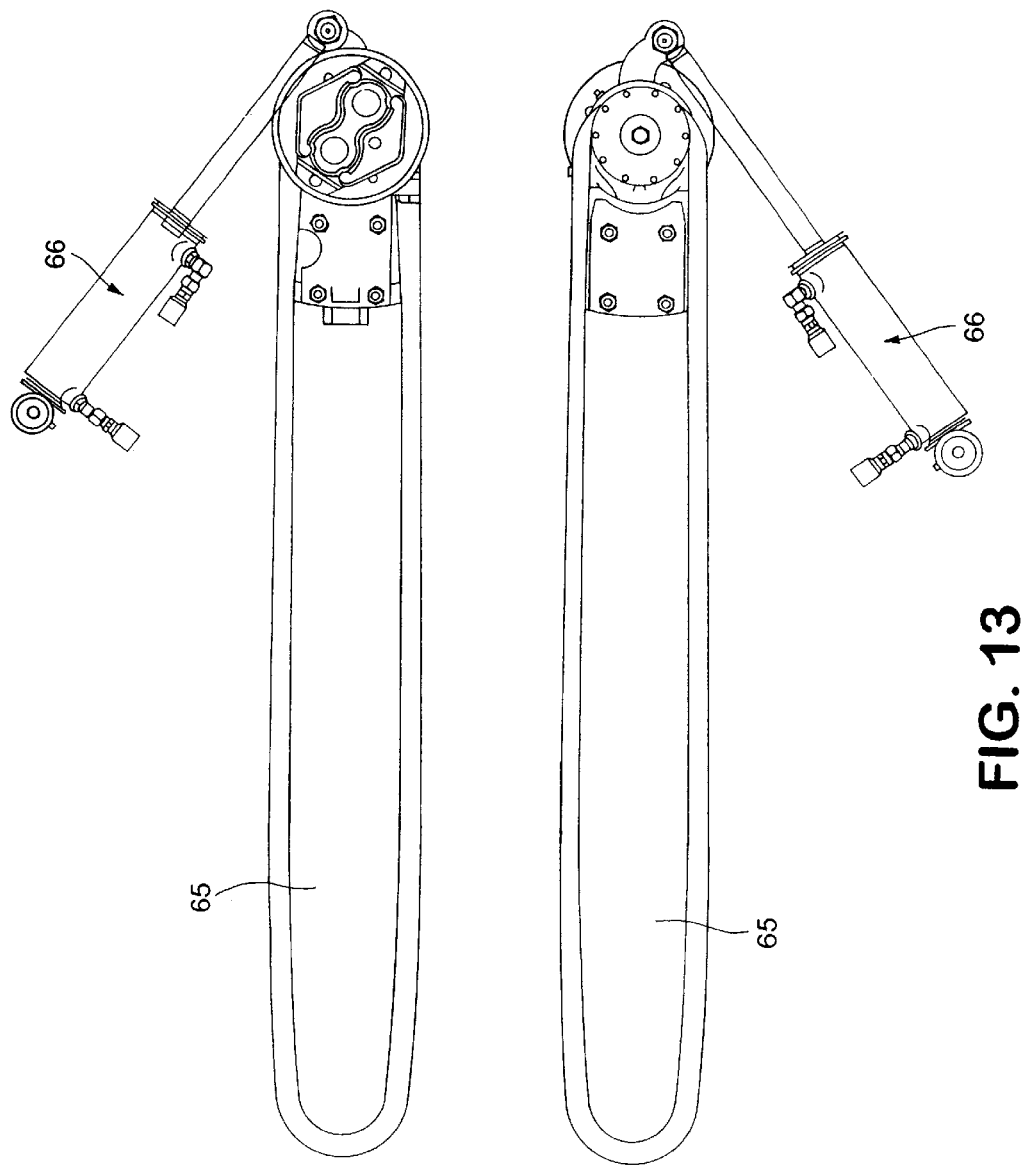
FIG. 13 is a top plan view of the saw assembly.

The position of saw 20 is best shown in FIG. 6. Saw 20 is powered by a hydraulic saw motor 64 mounted on housing 25. Saw 20 is preferably a conventional chain saw 20 having an elongated blade 65, such as a HARVESTER™ brand saw available from Oregon Saw Company. Pivoting motion of saw blade 65 is actuated by a saw hydraulic ram 66 (FIG. 12). In operation, saw blade 65 pivots relative to vessel housing 25 in a horizontal plane above grapple assembly 44 to cut a submerged tree 10a. The cutting path of saw blade 65 is illustrated in dotted outline FIG. 14.

Occasionally saw blade 65 may become stuck in a submerged tree 10a during a cut. In order to address this potential problem, saw blade 65 is preferably constructed to snap off at its connection to underwater vessel housing 25 upon actuation of hydraulic extraction rams 56. As explained above, extension of extraction rods 54 driven by rams 56 causes grapple assembly 44 to deliver a force sufficient to drive underwater vessel 16 away from tree 10a. This in turn causes saw blade 65 to snap off and remain lodged in tree 10a. Underwater vessel 16 may then be returned to surface vessel 14 for installation of a replacement saw blade 65.

Figure 15:
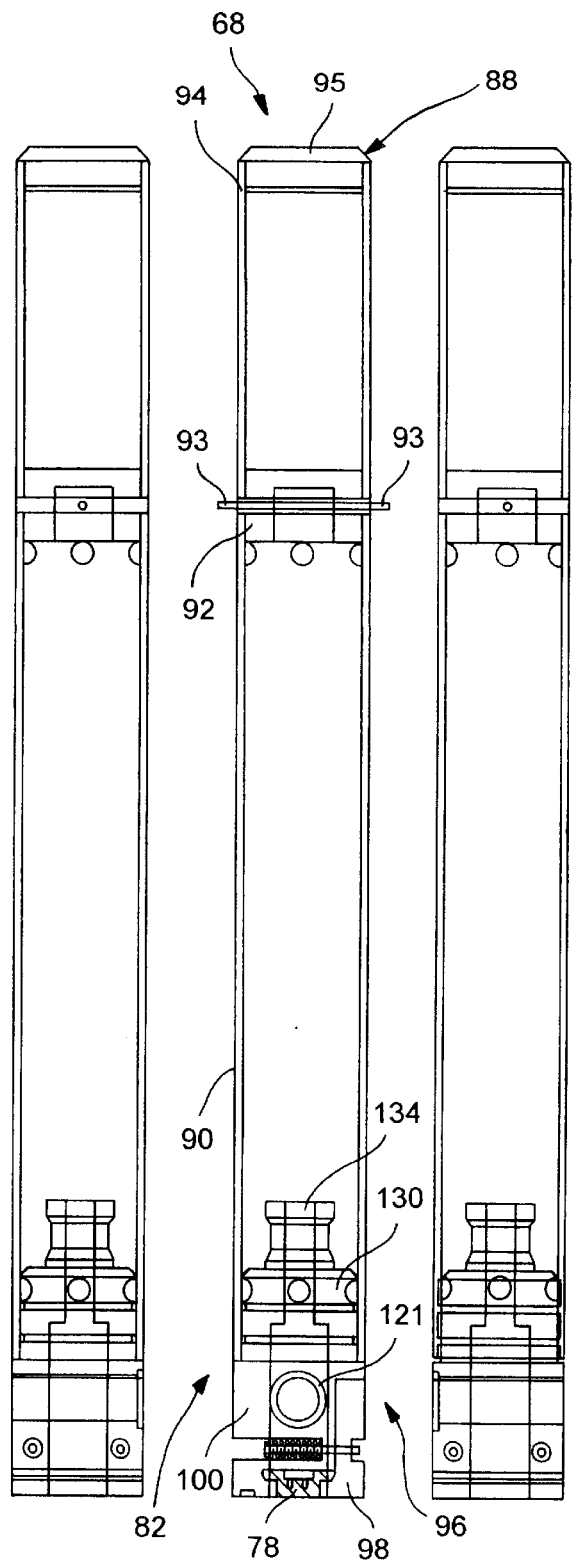
FIG. 15 is a front elevational view of an assembled air bag cylinder.
Figure 16:
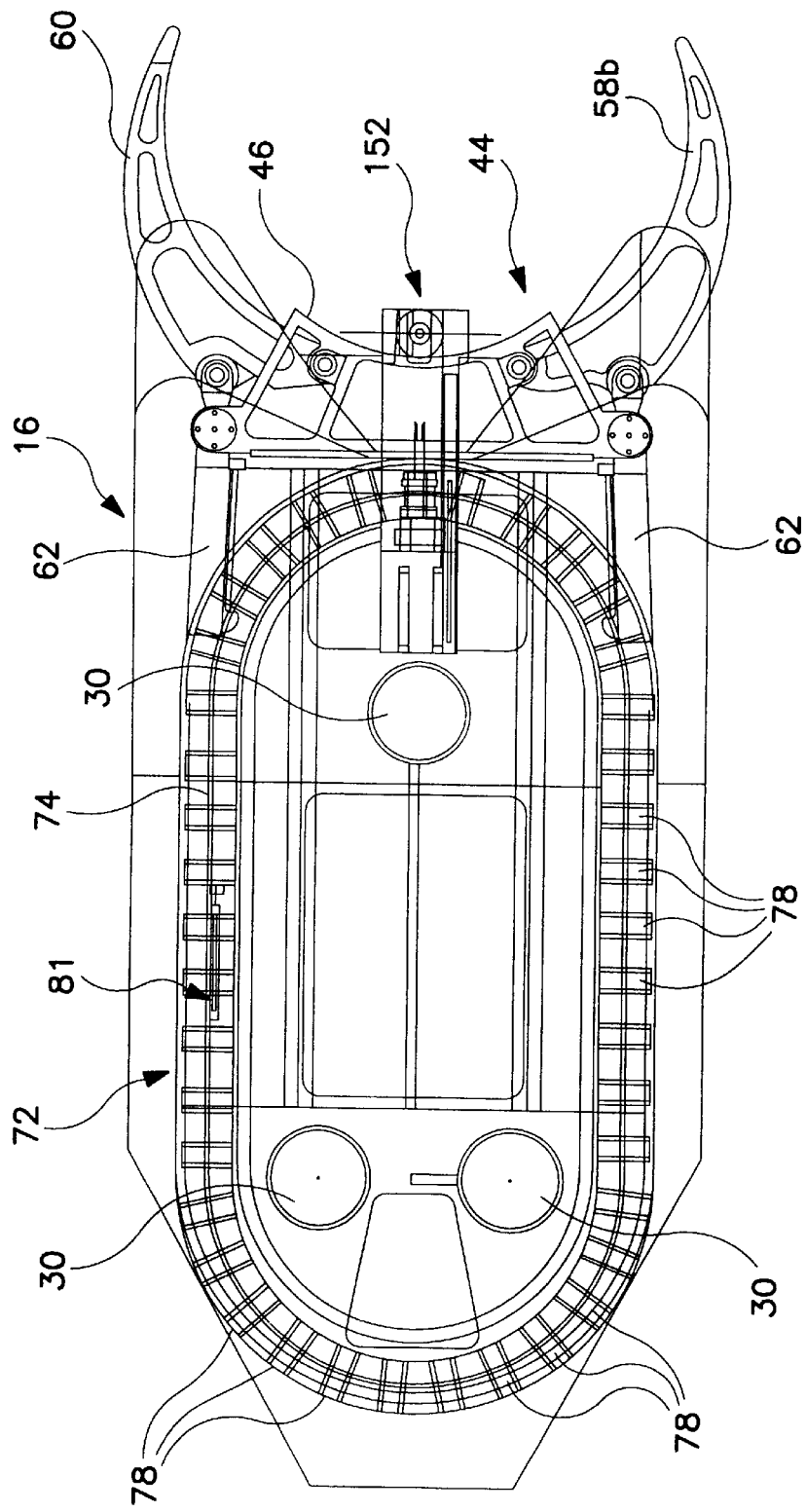
FIG. 16 is a top plan view of the oval air bag cylinder magazine track.
Figure 17:
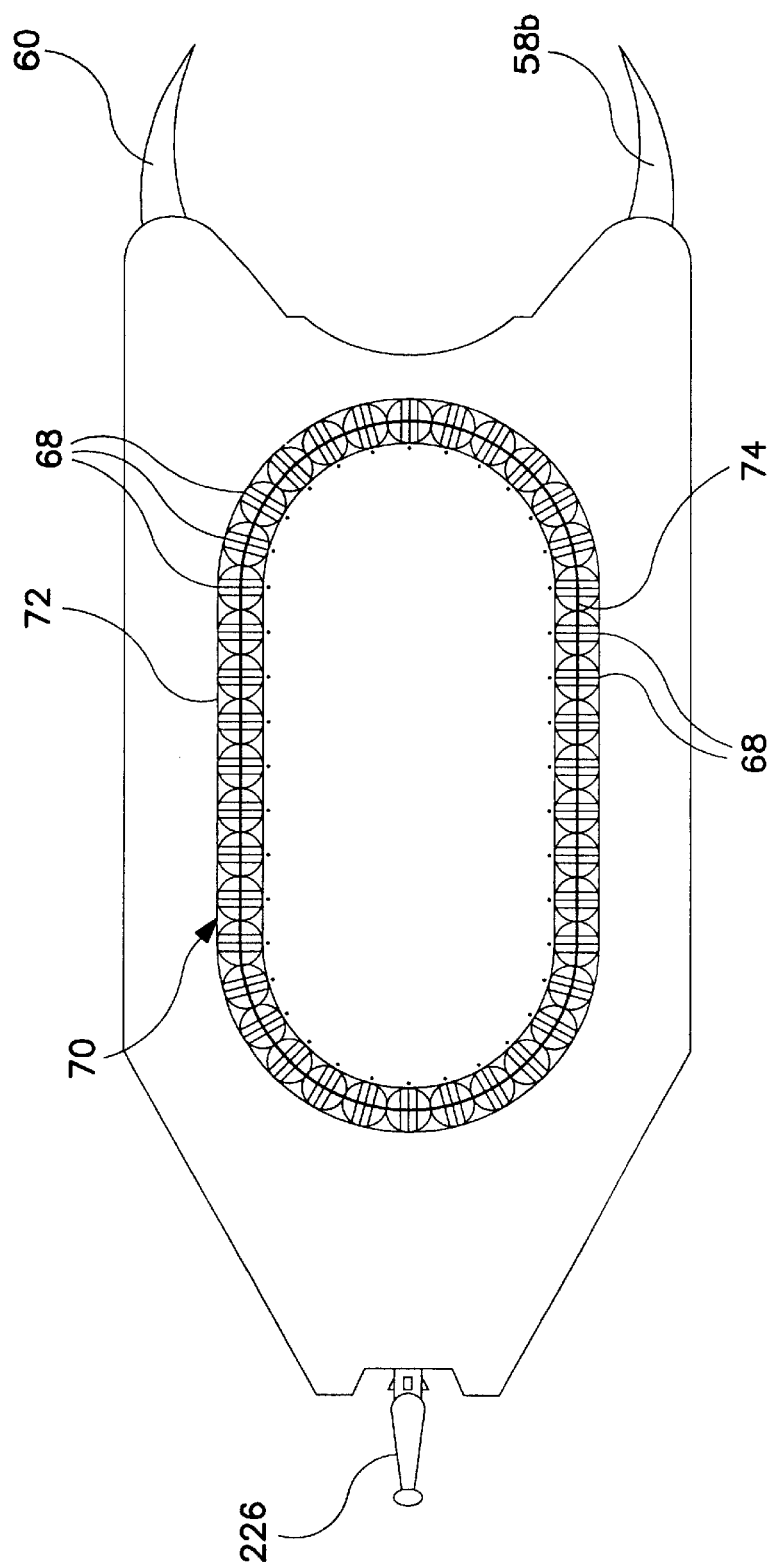
FIG. 17 is a top plan view of the magazine track of FIG. 16 loaded with an array of air bag cylinders.

As indicated above, in the Applicant's invention a cut tree 10b is retrieved to the water surface 22 through the use of an air bag 24 deployed from and inflated by underwater vessel 16. Prior to deployment, each air bag 24 is contained within an air bag cylinder 68 shown generally in FIG. 15. As shown in FIGS. 16 and 17, underwater vessel 16 comprises a magazine 70 for holding a plurality of cylinders 68. The illustrated embodiment has capacity to hold forty cylinders 68 although the number may vary without departing from the invention.

Figure 18:
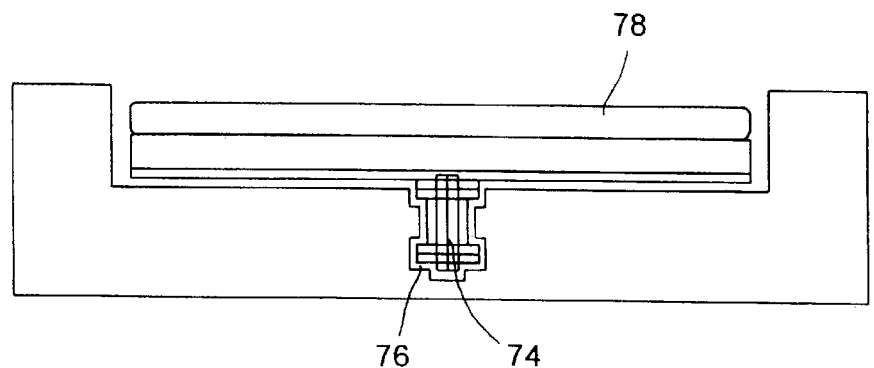
FIG. 18 is a cross-sectional view of the magazine track showing a chain drive mounted for movement within a groove formed in the magazine floor.
Figure 19:
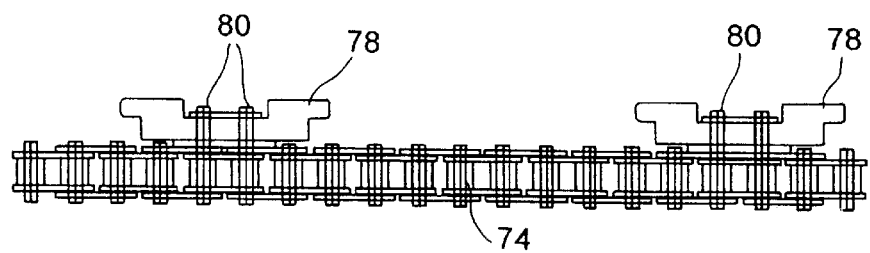
FIG. 19 is a side view of a comlink connecting a magazine T-rail to the chain drive.
Figure 20:
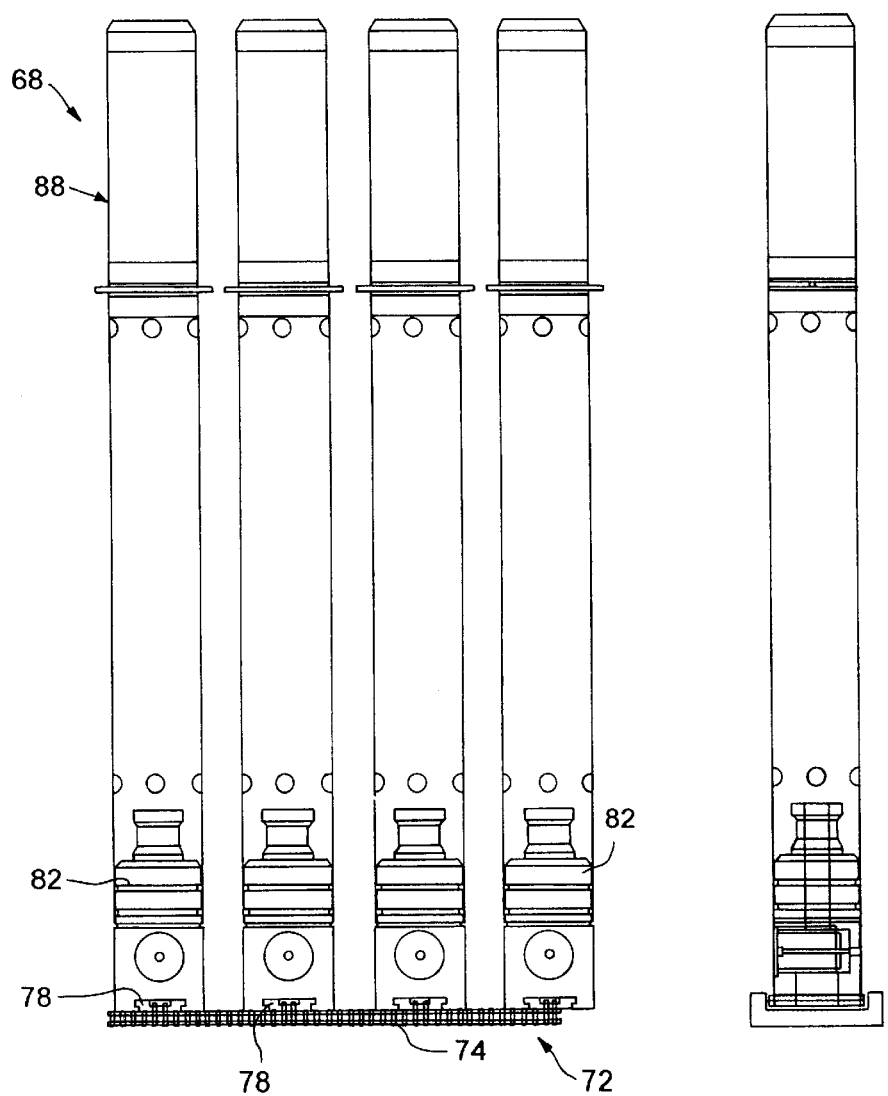
FIG. 20 is a side view of several air bag cylinders mounted on magazine T-rails.

In the illustrated embodiment, magazine 70 comprises an oval track 72 located within the interior of underwater vessel 16. Air bag cylinders 68 are loaded in a vertical orientation in track 72. A chain 74 is driven in a groove 76 in the floor of magazine track 72 (FIGS. 18–20). A plurality of upwardly projecting magazine T-rails 78 are coupled to chain 74 at spaced-apart locations. Each T-rail 78 is coupled to chain 74 with a comlink 80 which extends through a central portion thereof (FIG. 19).

Figure 21A:
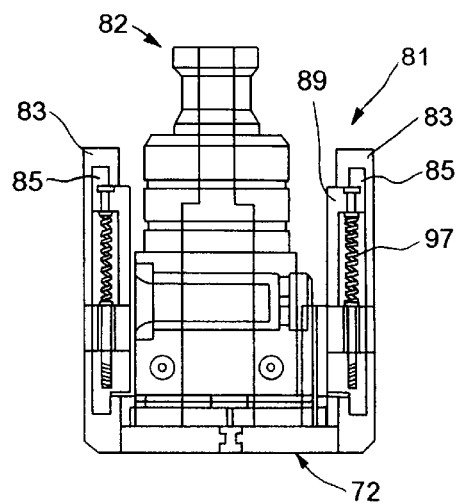
FIG. 21a is a front elevational view of an indexer for advancing the magazine T-rails.
Figure 21B:
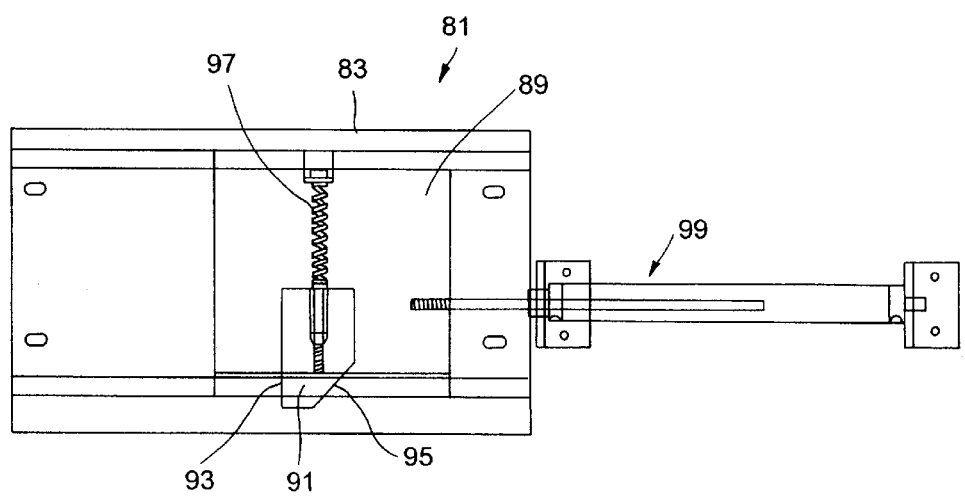
Figure 24:
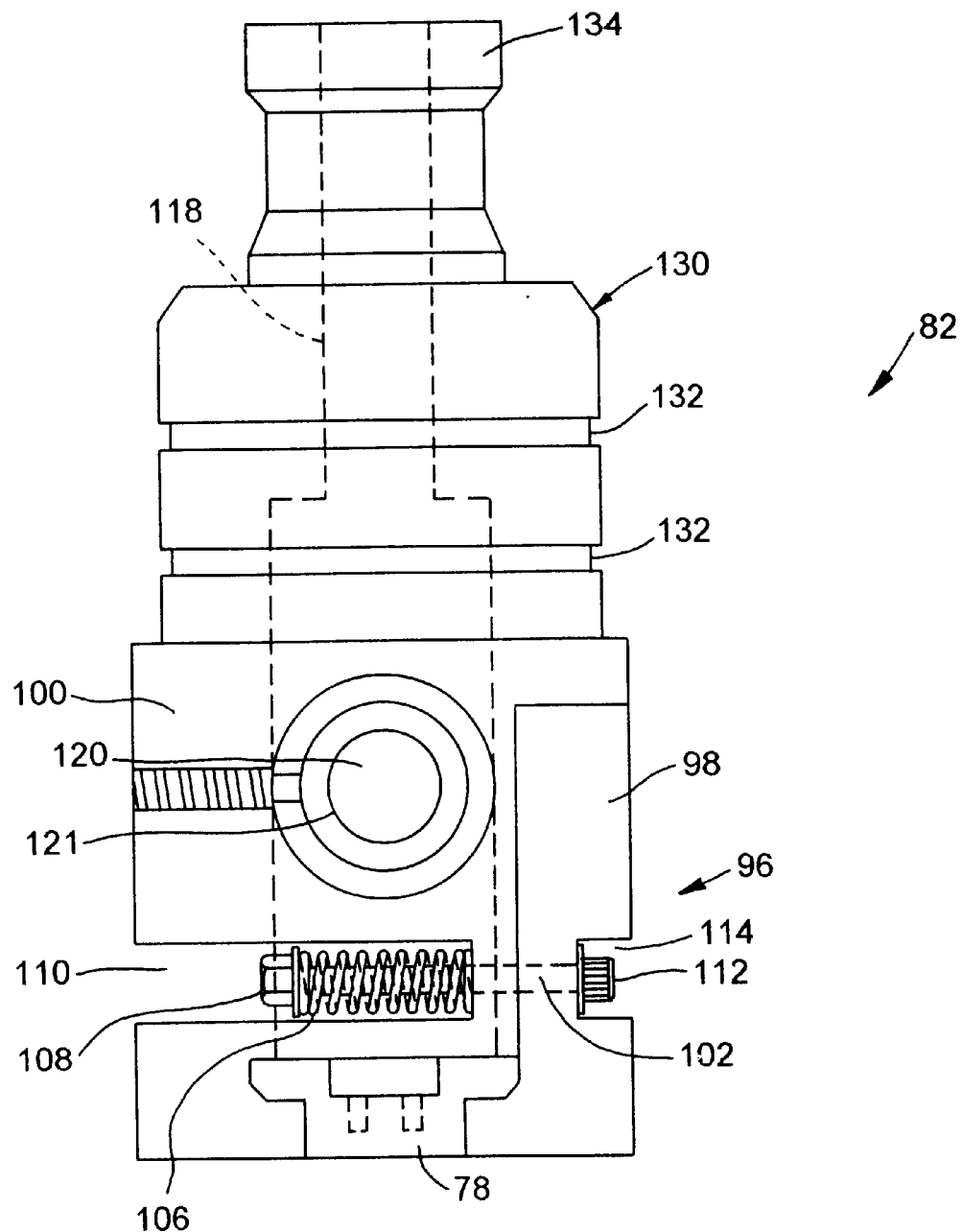
FIG. 24 is a front view of the cartridge of FIG. 23 with the base portions pivoted to an open position to facilitate mounting on a magazine T-rail.

As explained in detail below, magazine T-rails 78 convey air bag cylinders 68 around track 72. FIGS. 21a and 21b illustrate an indexer generally designated 81 for advancing the T-rails 78 (and hence cylinders 68) in the desired increments. Indexer 81 includes a pair of upstanding vertical plates 83 disposed on opposed sides of track 72 in a stationary position. Each plate 83 has upper and lower slots 85 for slidably receiving mating flanges formed on indexer support frames 89. Each frame 89 supports a downwardly extending lug 91 having a flat leading edge 93 and a tapered trailing edge 95. Each lug 91 is biased downwardly into engagement with a lateral portion of magazine T-rail 78 by a spring 97 captured within a recess formed in a respective support frame 89. Sliding movement of each support frame 89 is actuated by a hydraulic cylinder 99. Extension of cylinders 99 causes opposed support frames 89 to slide forwardly in unison relative to stationary plates 83. This in turn causes the leading edges 93 of lugs 91 to push a T-rail 78 forwardly relative to the track floor. Since T-rails 78 are all connected to the same chain 74, the other T-rails 78 are advanced around track 72 in the same increment.

After the advancement stroke, hydraulic cylinders 99 are then retracted causing support frames 89 to slide rearwardly to their resting position. This in turn causes the tapered trailing edge 95 of each lug 91 to ride over the next-in-sequence T-rail 78 and snap into place immediately behind the trailing edge thereof. Indexer 81 is then ready for the next advancement cycle. In this manner T-rails 78, and hence air bag cylinders 68 mounted thereon, may be precisely advanced around track 72 in predetermined increments as cylinders 68 are ejected from underwater vessel 16. In alternative embodiments of the invention operation of indexer 81 may be manually controlled by the operator located in control unit 36 or it may be automatically controlled based on feedback received from air bag cylinder position sensors (described further below). Other similar means for advancing air bag cylinders 68 in magazine 70 may be envisioned by a person skilled in the art.

Figure 25:
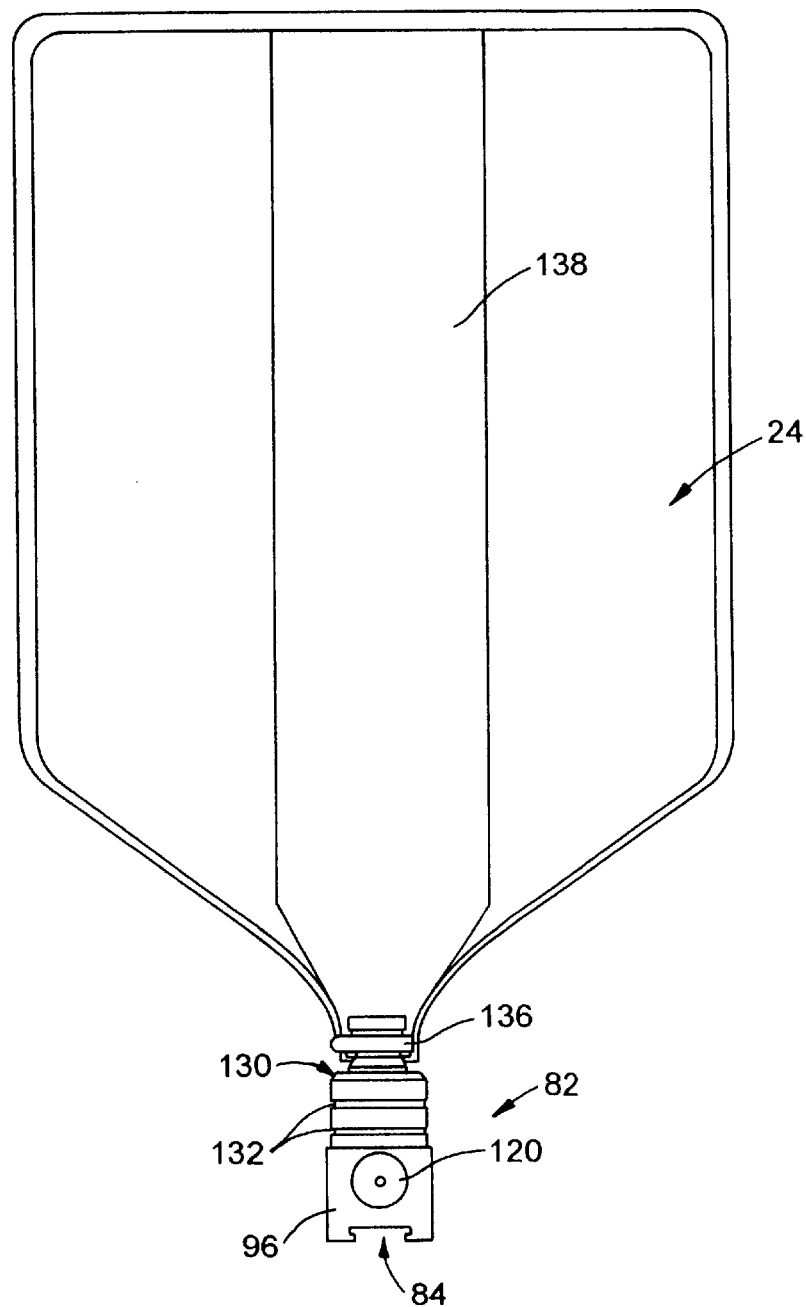
FIG. 25 a front elevational view showing an inflated air bag clamped to a cartridge.
Figure 29:
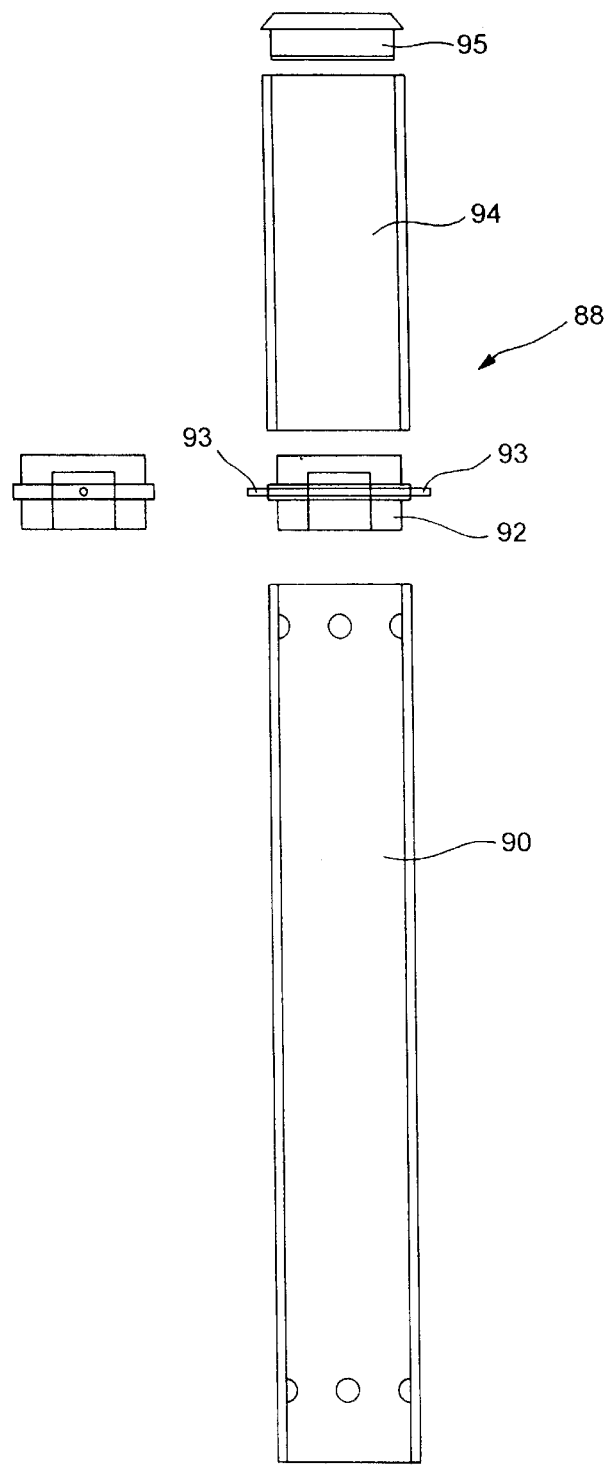
FIG. 29 is an exploded view of a housing component of the air bag cylinder for containing an uninflated air bag.

Each of the air bag cylinders 68 includes a cartridge 82 at its lower end releasably connectable to track 72 (FIG. 20). In particular, each cartridge 82 has a slot 84 at its lower end for receiving a magazine T-rail 78 as best shown in FIG. 23. Each air bag cylinder 68 further includes an inflatable air bag 24 which is secured to cartridge 82 (FIG. 25). Air bag 24 is retained within a tubular housing 88 prior to deployment and inflation as shown in FIG. 35. As best shown in FIG. 29, housing 88 includes a lower section 90, an intermediate section 92 and an upper section 94. Lower section 90 is hollow for accommodating the storage of an uninflated air bag 24 therein. Intermediate section 92 has two tabs 93 projecting outwardly from opposed sides. Top section 94 is sealed from intermediate portion and is filled with air or foam to compensate for the weight of air bag 86 and housing 88 (which may depend, for example, on the elevation of the logging site). After the buoyancy characteristics of top section 94 have been adjusted as aforesaid, a plug 95 is fitted in an upper access aperture to seal the inner chamber. By reason of top section 94, each air bag cylinder 68 is "buoyancy neutral" meaning that as cylinders 68 are expelled from underwater vessel 16, as explained below, the buoyancy (vertical position) and balance (horizontal orientation) of vessel 16 is not affected.

The structure of each cartridge 82 is illustrated more specifically in FIGS. 22–26. Cartridge 82 includes a base 96 comprised of a first portion 98 and a second portion 100 which together define slot 84. Base portions 96, 98 are pivotably coupled together by a pair of fasteners 102. Each fastener 102 includes a rod 103 which extends transversely within a borehole 104 formed in base portions 98, 100. Fastener 102 has a spring 106 mounted at one end thereof by means of a first nut 108. Spring 106 and first nut 108 are captured within a recess 110 formed in base portion 98. A second nut 112 is mounted at the opposite end of fastener 102 within a recess 114 formed in base second portion 100.

As shown in FIG. 23, cartridge base portions 98, 100 may be pivoted relative to one another to facilitate coupling (and, when necessary, decoupling) of air bag cylinders 68 to magazine T-rails 78. This enables convenient loading of cylinders 68 on to magazine 70 through a hinged side access door 105 of vehicle 16 as shown in FIG. 2. In particular, base portions 98, 100 of a cartridge 82 may be manually spread apart to straddle a respective T-rail 78 and then snapped into place. Spring 106 biases cartridge base portions 98, 100 together to ensure that each cartridge 82 securely engages a T-rail 78 when it is loaded in position.

Figure 26:
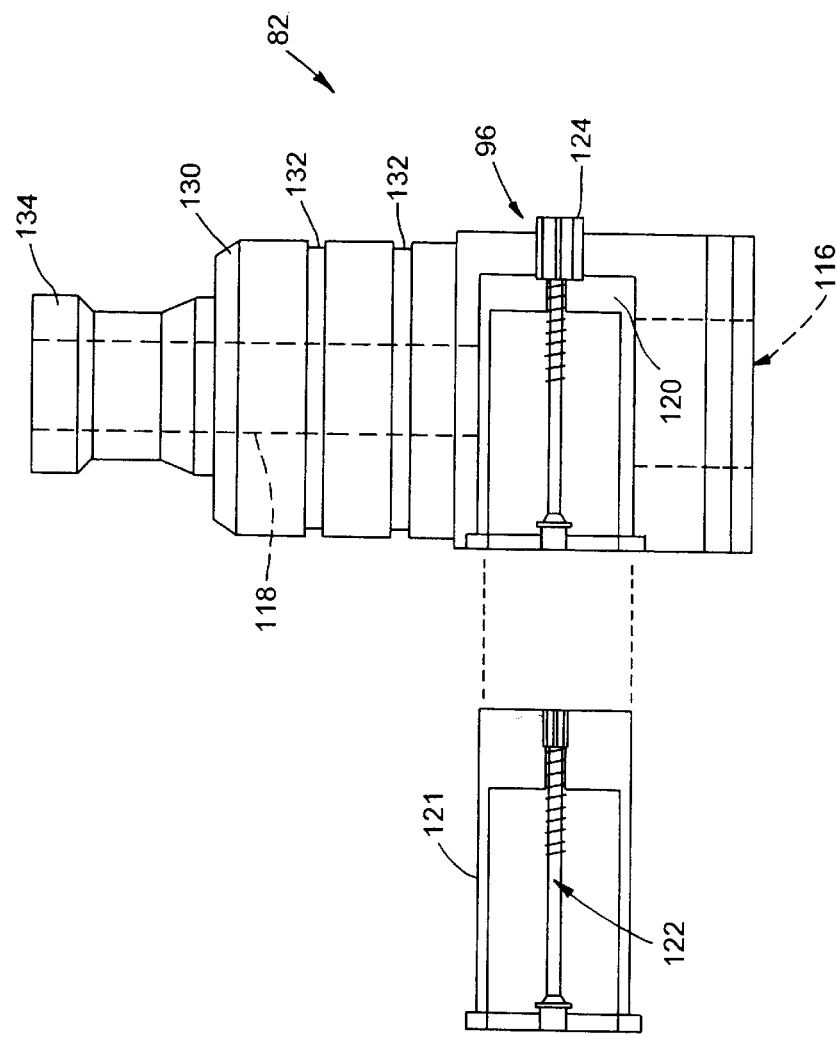
FIG. 26 is a partially exploded view showing a fastener barrel insertable into the cartridge.
Figure 27:
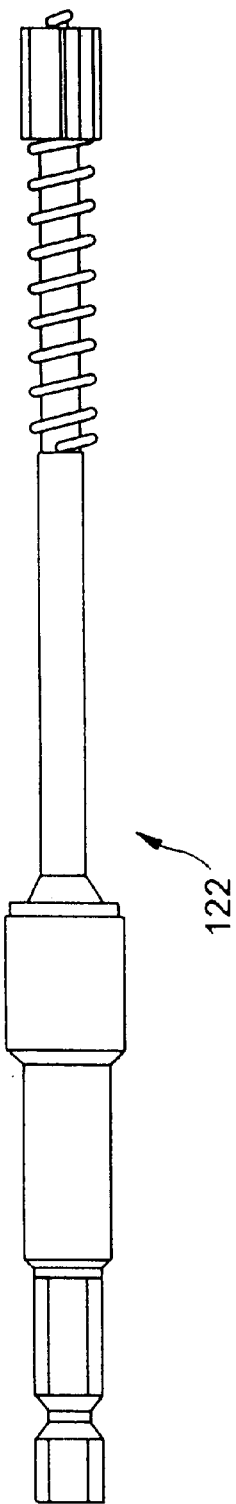
FIG. 27 is a side view of an exemplary tree fastener.
Figure 28D:
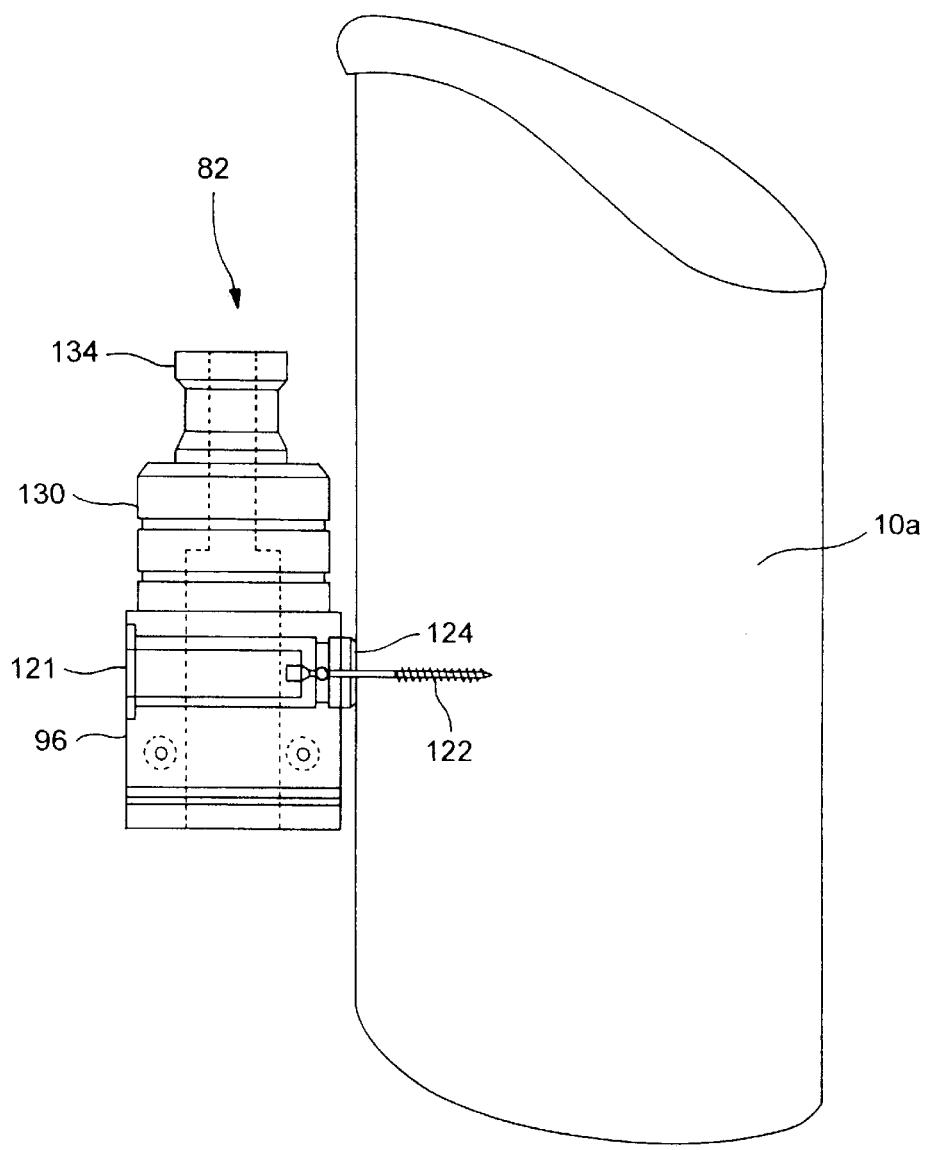

As shown best in FIG. 26, each cartridge 82 includes an air inlet aperture 116 formed in base 96. Air inlet aperture 116 is in communication with air bag 24 by means of a borehole 118 which extends vertically within cartridge 82 (as shown in dotted outline in FIG. 26). As discussed further below, air is injected through inlet 116 during deployment of cylinder 68 to inflate bag 24.

Cartridge 82 further includes a transverse aperture 120 formed in base 96 for accommodating a cylindrical barrel 121 housing a tree fastener 122. Fastener 122 secures air bag cylinder 68 to an adjacent submerged tree 10a as described further below. In the illustrated embodiment, a plug 124 is mounted at the forward end of aperture 120 for receiving fastener 122. Plug 124 may comprise, for example, a masonry anchor or screw retainer. In this embodiment of the invention fastener 122 is threadedly coupled to plug 124 and is driven into tree 10a by the action of a remotely actuated hydraulic tool insertable into aperture 120 during the bag deployment procedure described further below. Plug 124 ensures that the head of fastener 122 is maintained within barrel 121 when fastener 122 is deployed, thereby coupling cartridge 82 to tree 10*a*.

Fastener barrel 121 rotatably couples cartridge 82 to tree 10*a*. Accordingly, after tree 10*a* is cut as described below, cartridge 82 can rotate 180° relative to fastener 122 to permit tree 10*a* to float to water surface 22 butt end (i.e. sawn end) first.

As will be apparent to a person skilled in the art, other means for securely fastening an air bag cylinder 68 to a tree 10*a* may be envisaged. For example, non-threaded fasteners which are driven rather than screwed into tree 10*a* may be employed. Such fasteners could be withdrawn as needed from a fastener belt (not shown) carried on underwater vessel 16.

As shown in FIGS. 22–26, cartridge 82 further includes an intermediate portion 130 having one or more circumferential slots 132 formed therein for receiving O-rings (not shown). O-rings are used for sealingly coupling tubular housing 88 to cartridge 82.

Cartridge 82 also comprises a spool-shaped upper portion 134 which is tightly secured to a lower portion of air bag 24 with a clamp 136 (FIG. 25). Air bag 24 is constructed from ballistic nylon or any other suitable material. Air bag 24 may have a liner 138 on that portion of its exterior that comes into contact with a tree 10*a* (FIG. 25). Liner 138 provides protection for air bag 24 against punctures caused by branches on tree 10*a* and the like. It will be appreciated that the size and shape of air bags 24 can be modified within the inventive scope of the invention.

Figure 30:
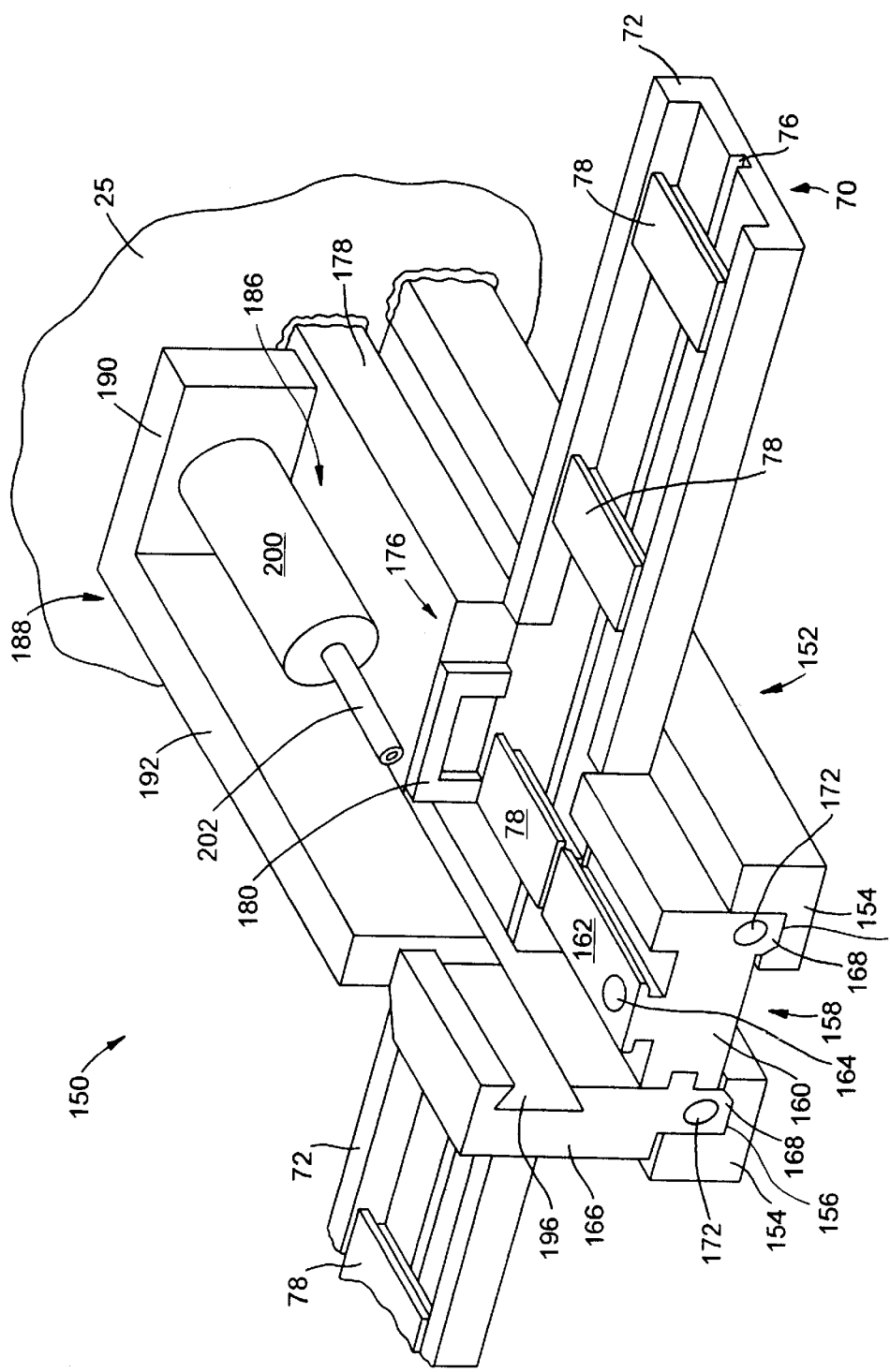
FIG. 30 is partially fragmented, enlarged isometric view of the air bag deployment and inflation assembly located at the front end of the underwater vessel with the air bag cylinders removed for purposes of clarity.
Figure 31:
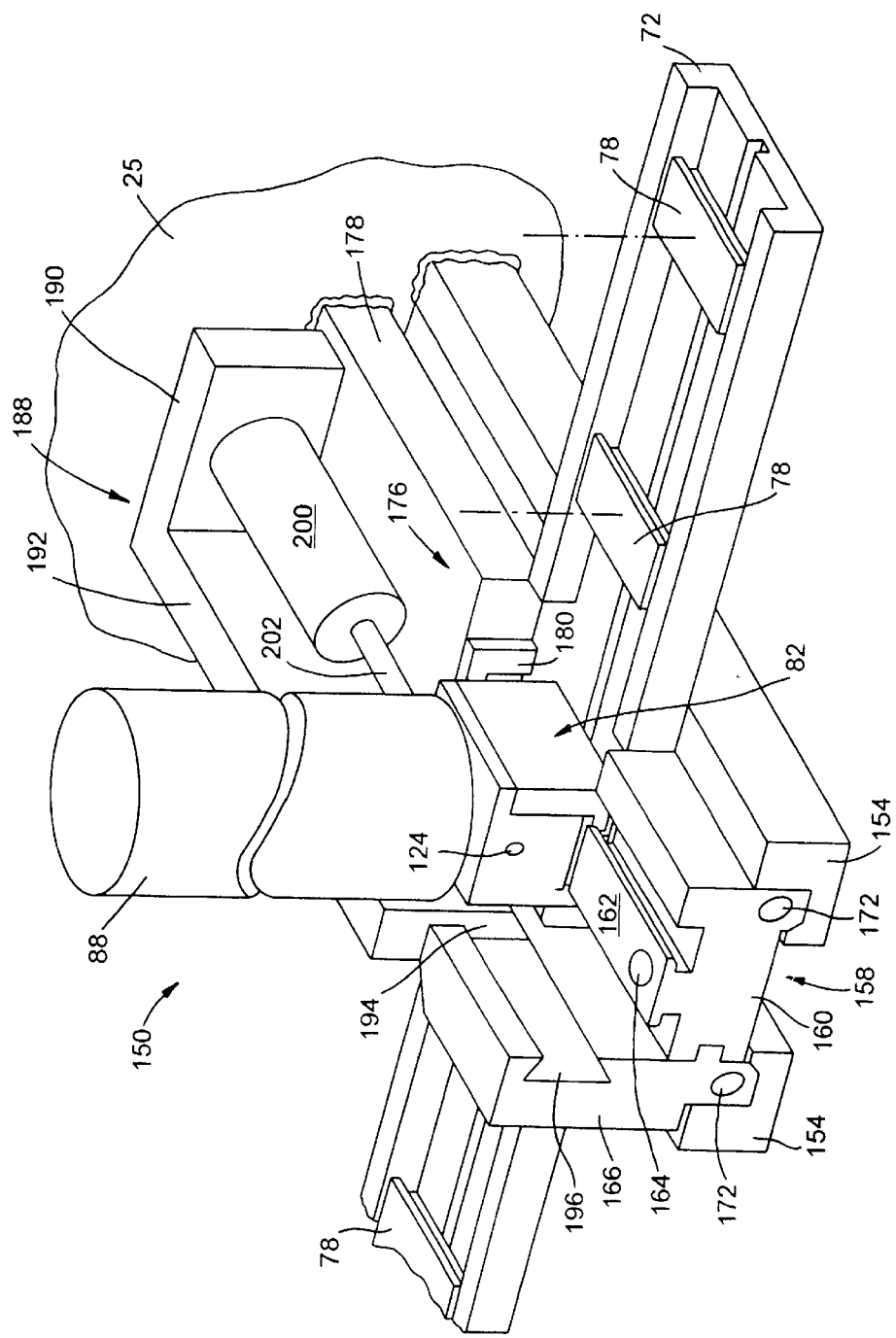
FIG. 31 is a partially fragmented, enlarged isometric view of the assembly of FIG. 30 showing an air bag cylinder positioned at the front end of the magazine track.

With reference to FIGS. 30–34, an air bag deployment and inflation assembly generally designated 150 is provided at the front end of underwater vessel 16 for conveying air bag cylinders 68 from magazine 70 into proximity with a submerged tree 10*a*. Assembly 150 is located within recess 48 directly above grapple assembly 44 and saw 20. Assembly 150 includes a stationary ejection track 152 rigidly secured to vessel housing 25 and extending perpendicular to magazine track 72. Ejection track 152 comprises a pair of spaced-apart parallel rails 154 each having a longitudinally extending slot 156 formed therein. Rails 154 support reciprocal sliding movement of a shuttle assembly 158 between a retracted loading position and an extended, deployed position, as described further below. Shuttle assembly 158 includes a shuttle base 160 having a shuttle T-rail 162 projecting upwardly therefrom. Shuttle T-rail 162 is alignable with a magazine T-rail 78 as shown in FIGS. 30 and 31 to facilitate transfer of an air bag cylinder 68 from magazine 70 to shuttle assembly 158 (only one cylinder 68 is shown in FIG. 31 for the purposes of clarity). Magazine track 72 is interrupted at the front end of vessel 16 to permit sliding movement of cartridge 82 (and the remaining components of air bag cylinder 68) on to shuttle assembly 158. Shuttle T-rail 162 has an air inlet aperture 164 which extends through base 160 and is alignable with air inlet aperture 116 of a cartridge 82 when the cartridge is loaded on to shuttle assembly 158.

Figure 32:
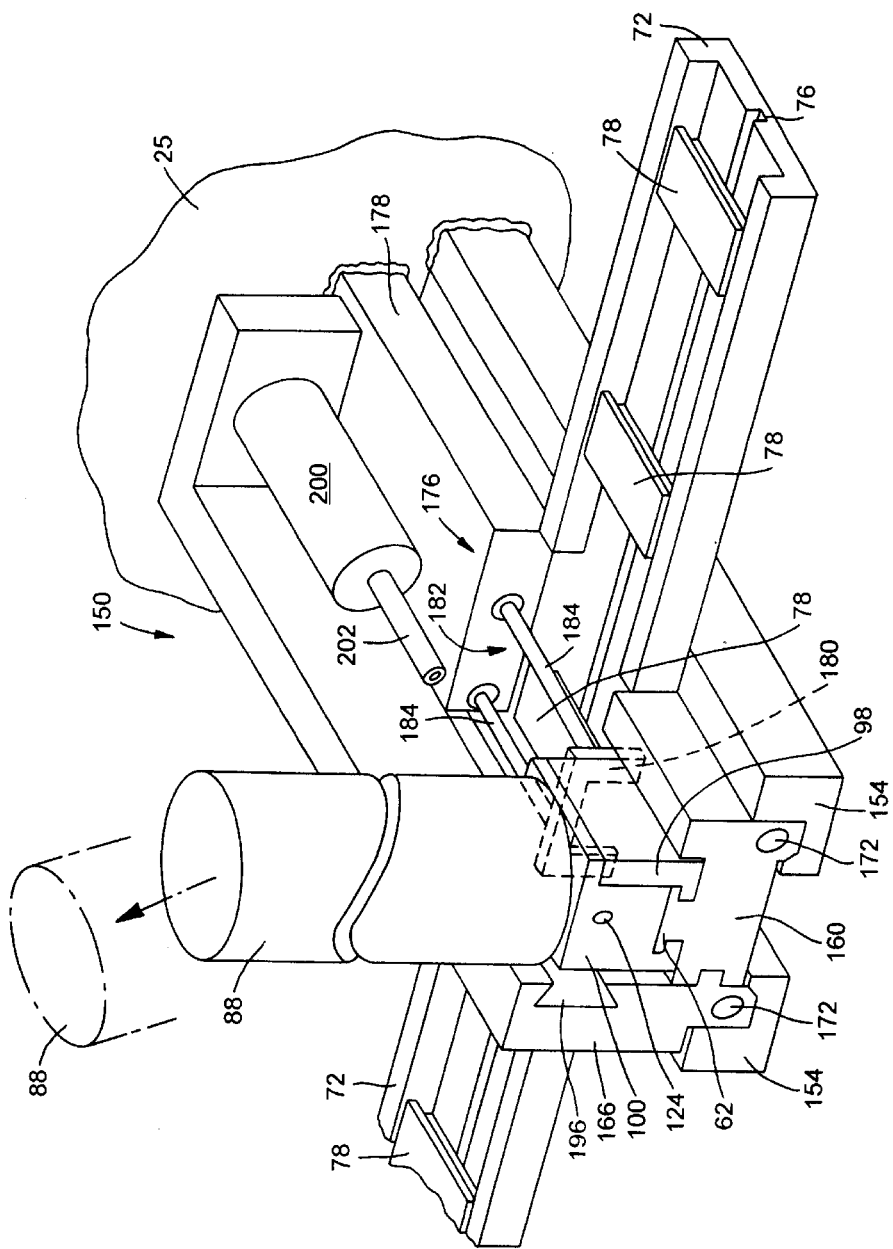
FIG. 32 is a partially fragmented, enlarged isometric view of the assembly of FIG. 32 showing an air bag cylinder in a loading position on the shuttle base and showing the air bag housing being ejected from the air bag cartridge.
Figure 33:
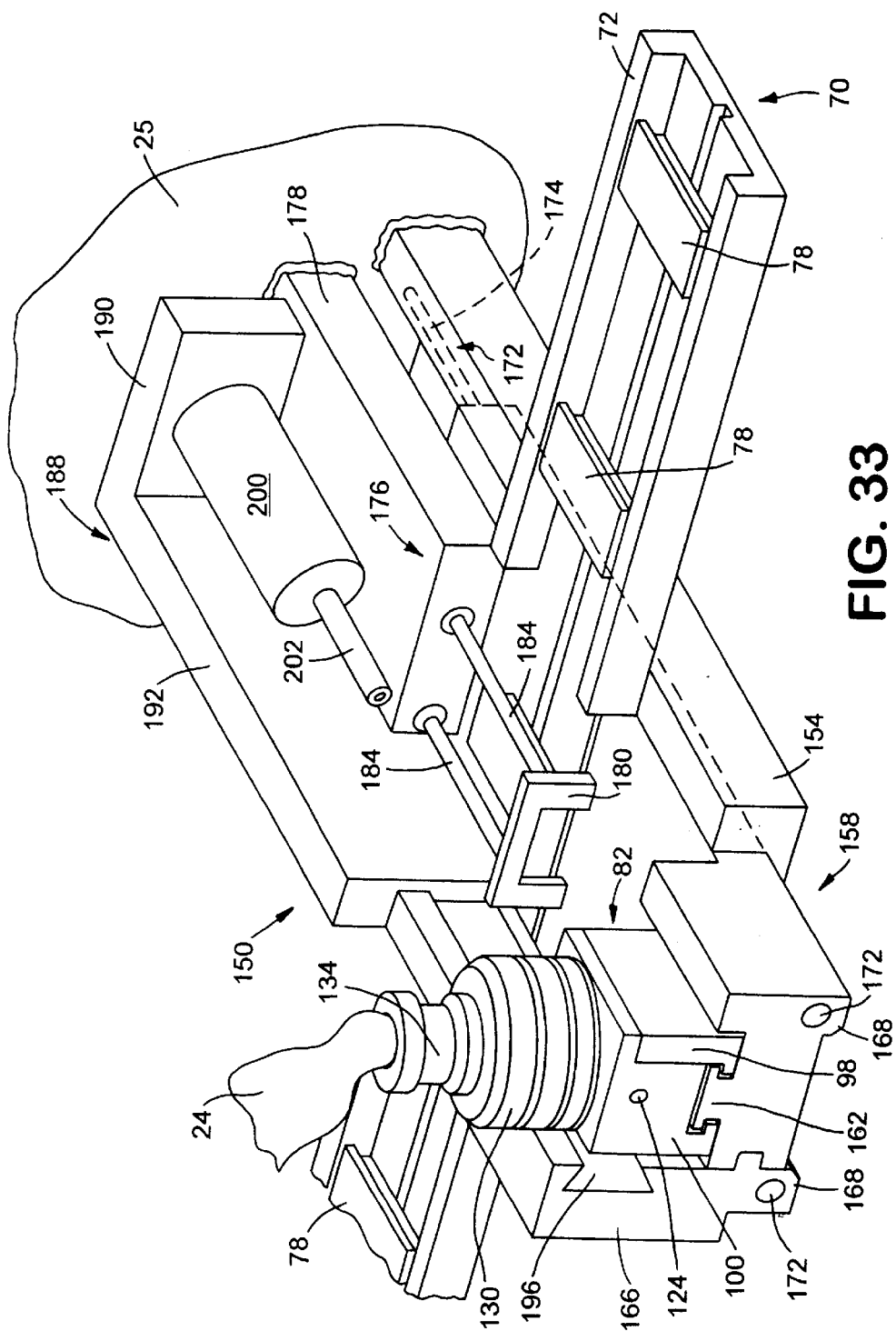
FIG. 33 is a is a partially fragmented, enlarged isometric view of the assembly of FIG. 32 showing the shuttle base advanced forwardly to a deployed position for engaging a tree.

In the embodiment of FIGS. 30–34, shuttle assembly 158 further includes a vertical sidewall 166 extending perpendicular to magazine track 72 which is securely coupled to shuttle base 160 and is moveable therewith. Both shuttle base 160 and sidewall 166 include a downwardly extending flange 168 slidable within a respective slot 156 of a rail 154. In this embodiment of the invention sliding movement of shuttle assembly 158 between the loading position (FIGS. 31 and 32) and the deployed position (FIG. 33) is actuated by a pair of hydraulic cylinders 170. Cylinders 170 include hydraulic rams 172 mounted in lower portions of shuttle base 160 and sidewall 166 and reciprocating rods 174 which extend rearwardly to engage a plate connected to a rear wall of recess 48 (FIG. 33). Extension of rods 174 causes shuttle assembly 158 to move to the deployed position shown in FIG. 33. Retraction of rods 174 causes shuttle assembly 158 to return to the loading position. As will be appreciated by a person skilled in the art, other equivalent means for actuating movement of shuttle assembly 158 between the loading and deployed positions may be envisaged.

Air bag deployment and inflation assembly 150 further includes a cartridge advancement assembly 176 for moving a cartridge 82 from magazine track 72 on to shuttle assembly 158. Assembly 176 includes a stationary frame 178 rigidly mounted on vessel housing 25 in a rear portion of recess 48. In the embodiment illustrated in the drawings, frame 178 is mounted at an elevation above ejection track 152. Frame 178 supports reciprocal movement of a cartridge advancement block 180 actuated by dual hydraulic cylinders 182. As shown in FIG. 32, extension of cylinder rods 184 causes advancement block 180 to slide cartridge 82 outwardly from a magazine T-rail 78 on to the shuttle T-rail 162 of shuttle base 160. Advancement block 180 is then reciprocated inwardly to the retracted position. As will be appreciated by a person skilled in the art, sliding movement of cartridge 82 may be actuated by the ends of rods 184 rather than advancement block 180 in an alternative embodiment of the invention.

Figure 34:
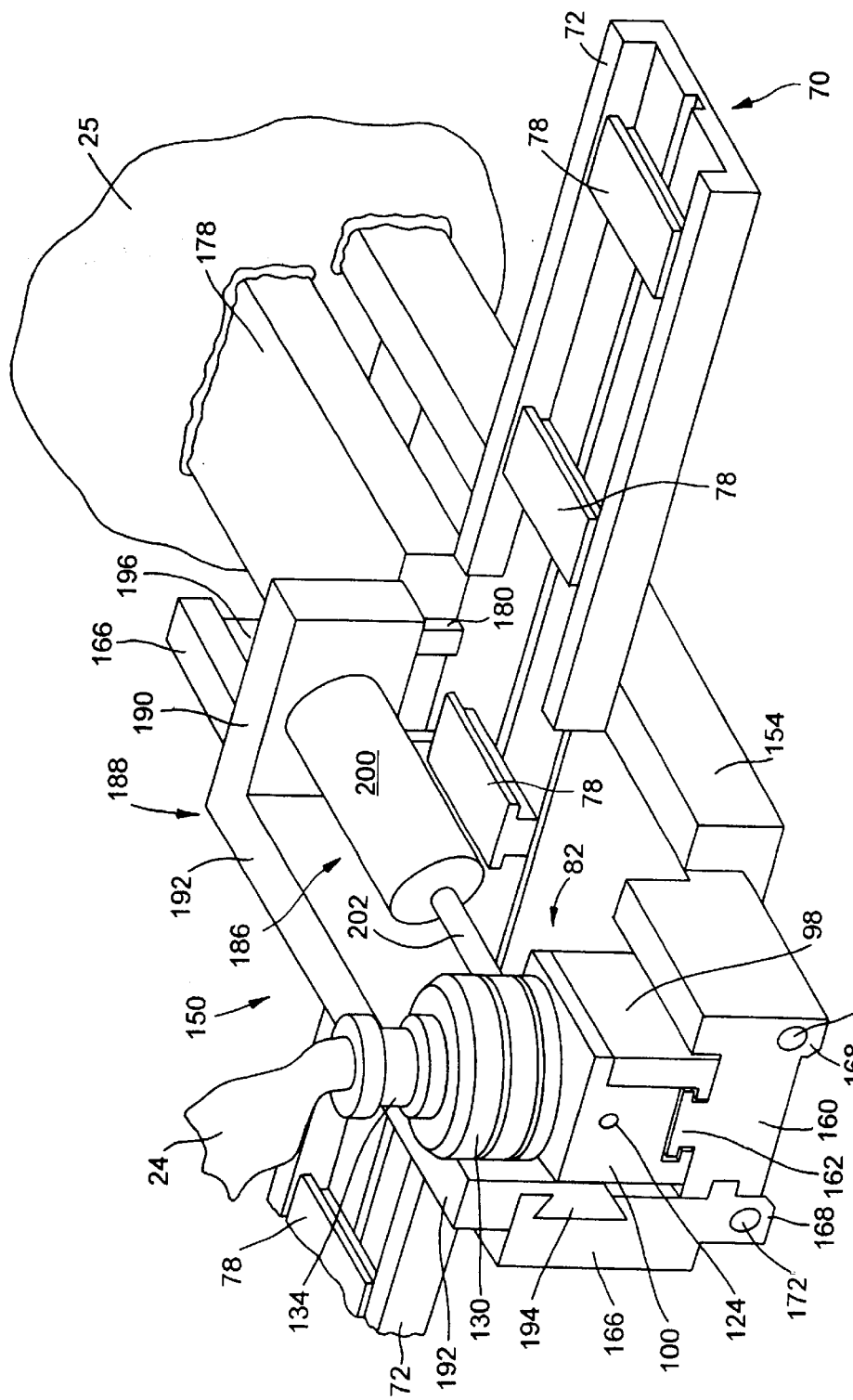
FIG. 34 is a partially fragmented, enlarged isometric view of the assembly of FIG. 33 showing the screw driving assembly advanced for engaging a tree fastener pre-loaded in the air bag cylinder cartridge.
Figure 37:
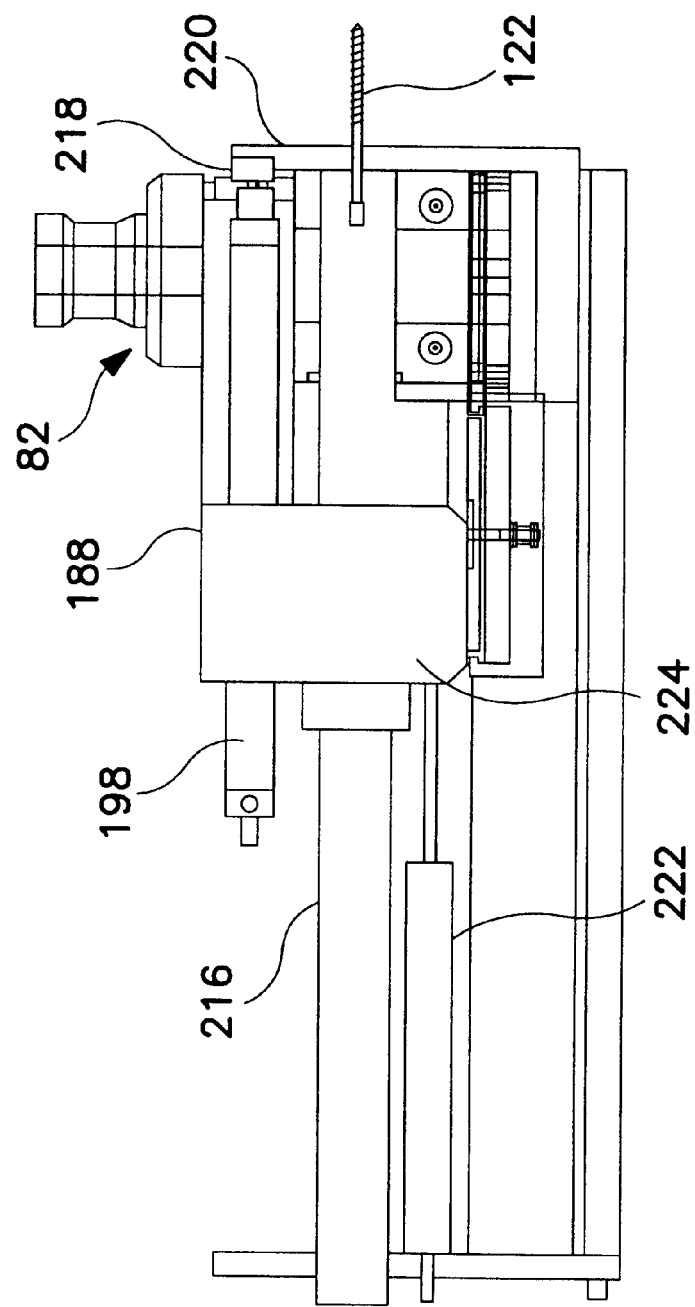
FIG. 37 is a side elevational view of an alternative embodiment of the invention including a modified screw actuator assembly.

A screw actuator assembly 186 is mounted for movement above cartridge advancement assembly 176. In the embodiment of FIGS. 30–34, assembly 186 includes an L-shaped screw actuator frame 188 comprising a rear wall 190 and a sidewall 192. Screw actuator assembly 186 is slidably coupled to shuttle assembly 158. In particular, an outer rib 194 is formed on sidewall 192 of screw actuator frame 188 which is slidable within a mating longitudinal slot 196 formed in an inner surface of sidewall 166 of shuttle assembly frame 158 (FIGS. 33–34). Sliding movement of screw actuator frame 188 is actuated by a hydraulic cylinder 198 connected, for example, to a rear surface of rear wall 190 (FIG. 37). A motor 200 is mounted on a front surface of rear wall 190 and extends forwardly for actuating movement of a tool 202. Tool 202 is insertable into aperture 120 of cartridge 82 for driving fastener 122 into tree 10*a* during the air bag deployment procedure. Frame 188 is shown slid forwardly toward cartridge 82 in FIG. 34.

Figure 36:
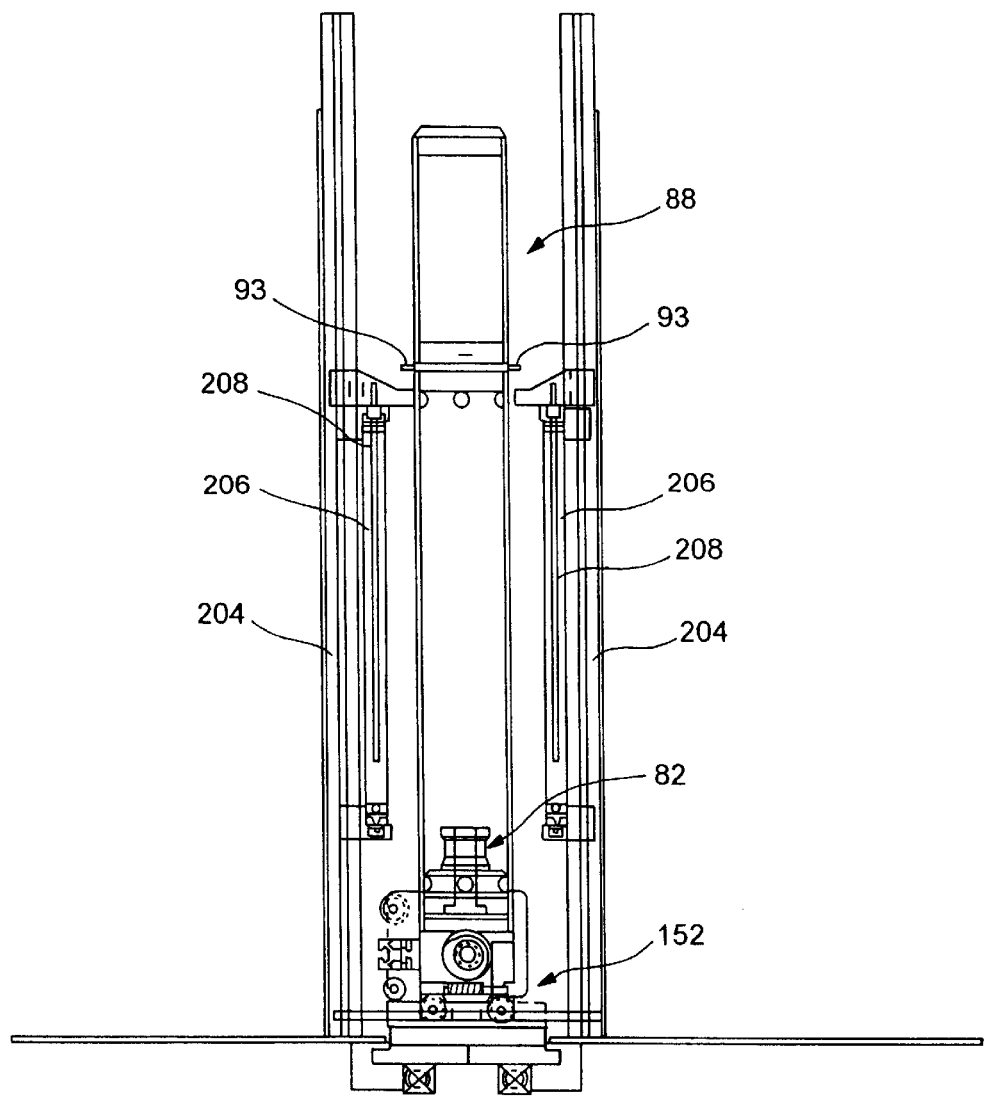
FIG. 36 is a front elevational view of vertically disposed hydraulic cylinders mounted at the front end of the underwater vessel on opposite sides of the ejection track for ejecting the tubular housing of an air bag cylinder to expose the air bag.

Air bag deployment and inflation assembly 150 further includes a pair of vertically disposed support bars or "tube ejectors" 204 securely mounted on housing 25 at the front end of underwater vessel 16 on opposite sides of ejection track 152 as shown best in FIGS. 35 and 36. Each bar 204 supports a vertically disposed hydraulic cylinder 206 comprising an extensible rod 208. When rods 208 are extended they engage tabs 93 which project laterally outwardly from opposite sides of intermediate section 92 of tubular housing 88 (FIG. 29). This causes tubular housing 88 to lift away from cartridge 82, thereby exposing air bag 24. As shown in FIGS. 35(*d*)–(*i*), a lanyard 210 is connected between a tab 93 and housing 88 for tethering housing 88 and air bag 24 together. This facilitates retrieval of housing 88 when air bag 20 rises to water surface 22 together with a cut tree 10*b*.

Figure 38:
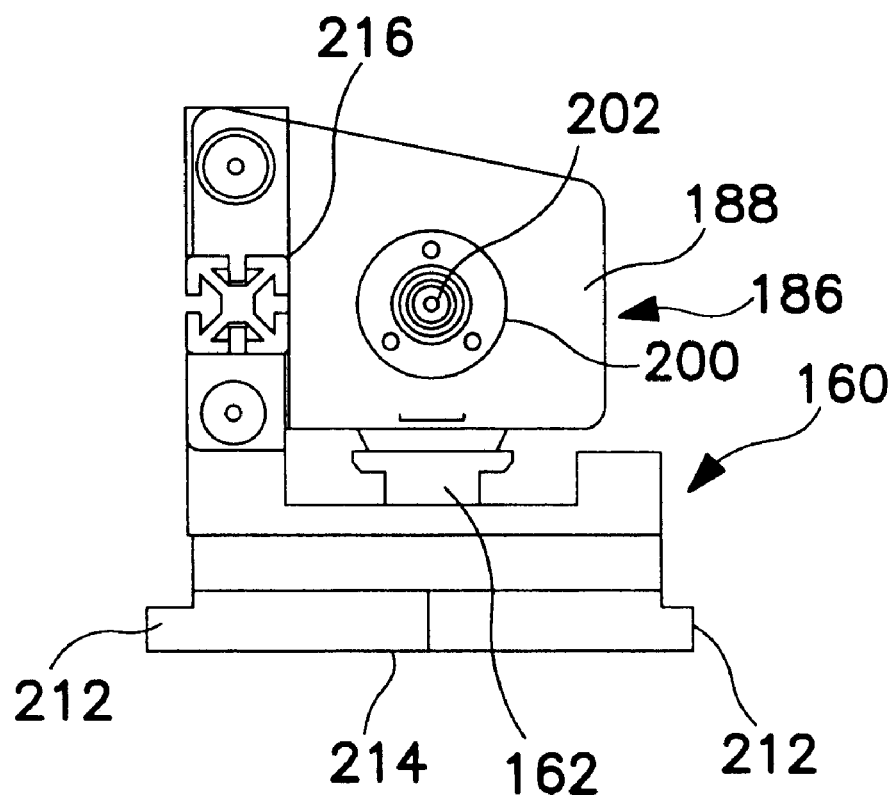
FIG. 38 is front elevational view of the embodiment of FIG. 37.
Figure 39:
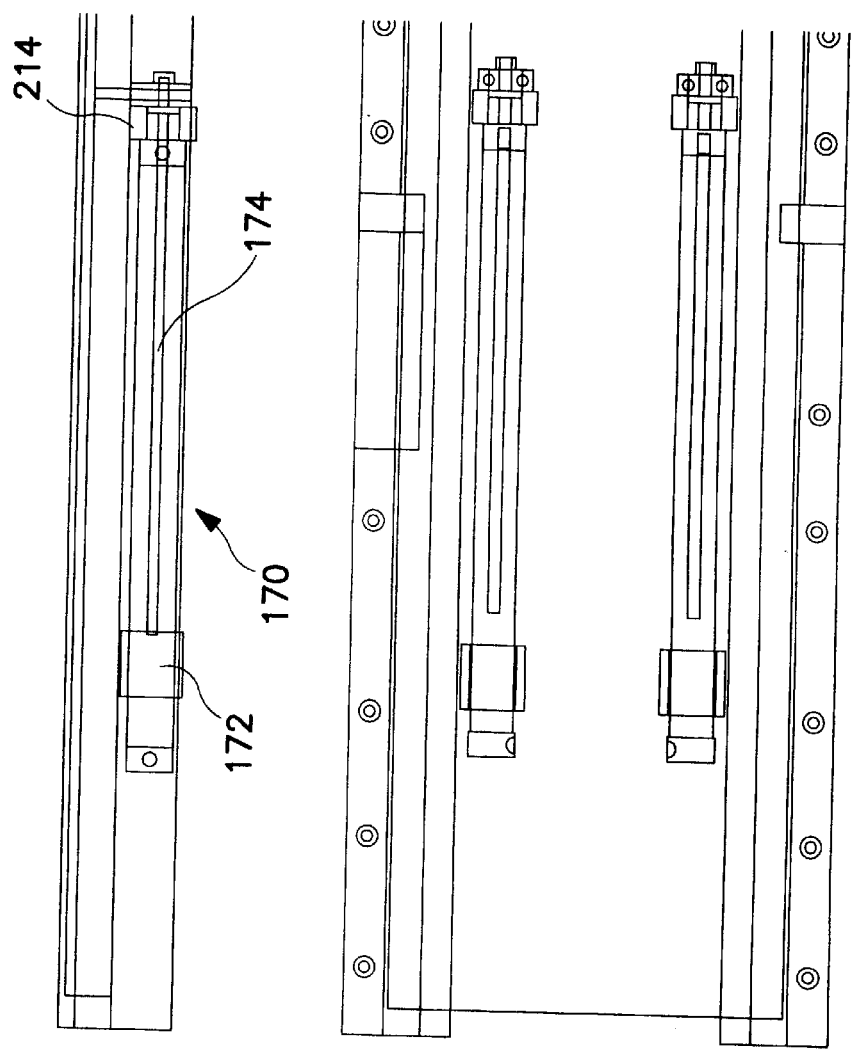
FIG. 39 is a side elevational view of an alternative embodiment of the invention comprising dual hydraulic cylinders coupled to an undersurface of the shuttle base for actuating movement of the shuttle between the loading and deployed positions.

FIGS. 37–40 illustrate an alternative embodiment of air bag deployment and inflation assembly 150 which functions in a manner similar to the embodiment described above. In this embodiment shuttle assembly 158 includes a modified base 160 having flanges 212 extending laterally from a bottom surface 214 thereof (FIG. 38). Flanges 212 are slidable within slots 156 defined by parallel rails 154 (FIG.

Figure 40:
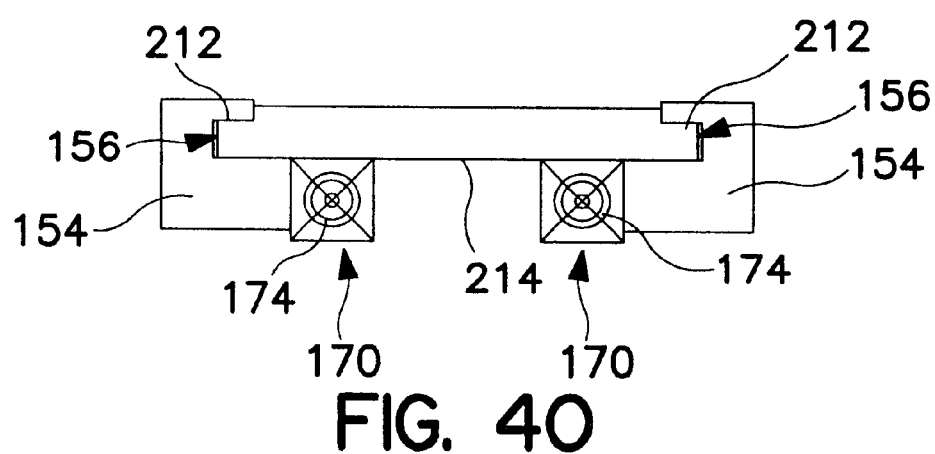
FIG. 40 is a front view of the embodiment of FIG. 39.

40). Sliding movement of shuttle assembly 158 is actuated by a pair of hydraulic cylinders 170. In this embodiment, hydraulic rams 172 are mounted in a rear portion of recess 48 underneath ejection track 152 and rods 174 are coupled to bottom surface 214 of base 160 (FIG. 40). Extension and retraction of rods 174 therefore causes shuttle base 160 to move between the loading and deployed positions as in the first embodiment of the invention described above.

In the alternative embodiment of the invention illustrated in FIGS. 37 and 38 the structure of cartridge advancement assembly 176 and screw actuator assembly 186 has also been modified. In this embodiment an advancement block is not used. Rather, the ends of hydraulic rods 184 extending forwardly from stationary frame 178 engage a cartridge 82 directly to advance it on to shuttle base 160. Rods 184 extend on either side of magazine T-rail 78 and engage a lower portion of the cartridge 82 mounted thereon.

As shown best in FIG. 38, a slotted support bar 216 is secured to a surface of shuttle base 160 and is moveable therewith in the alternative embodiment. Support bar 216 extends longitudinally on one side of ejection track 152 in a manner similar to sidewall 166 of the first embodiment described above. A screw actuator frame 188 is slidably coupled to bar 216. As in the first embodiment of the invention, frame 188 supports a motor 200 for operating a screw driving tool 202. However, in the alternative embodiment the hydraulic cylinder 198 for actuating sliding movement of frame 188, and hence tool 202, is disposed above a forward portion of support bar 216 (FIG. 37). Hydraulic cylinder 198 includes a rod 218 which is ordinarily extended to bear against a plate 220. As shown best in FIG. 37, extension of rod 218 maintains frame 188 in a rear portion of recess 48 and causes compression of a spring 222. Spring 222 is supported in a spring barrel 224 disposed beneath bar 216. When rod 218 is retracted, spring 222 is allowed to expand which causes frame 188 to slide forwardly until it engages cartridge 82. Tool 202 may then be actuated to drive fastener 122 into a tree 10(a) as in the first embodiment of the invention described above. Spring 222 is calibrated so that it advances frame 188 forwardly the precise amount necessary to bring screw actuator assembly 186 into engagement with cartridge 82 and hence the potential for operator error is avoided.

Figure 41:
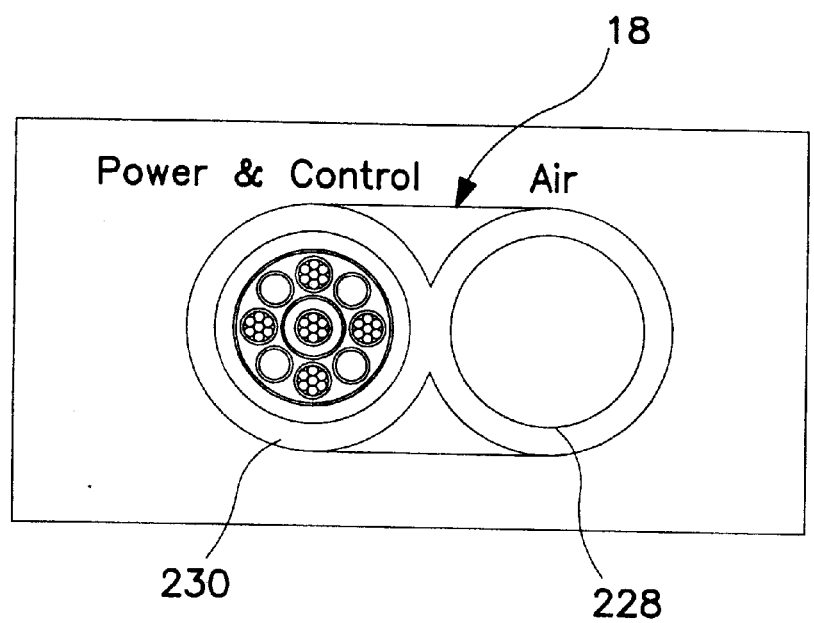
FIG. 41 is a cross-sectional view of the umbilical.

As indicated above, underwater vessel 16 and control unit 36 located on surface vessel 14 are operatively connected by a flexible umbilical 18. Umbilical 18 is connected to underwater vessel 16 at umbilical spout 226 (FIG. 2). As illustrated best in FIG. 41, umbilical 18 includes an air passageway 228 and an adjacent passageway 230 for power, data and video cords. Umbilical 18 may also be used for lifting during launch and recovery operations, and if so, the exterior can be braided with strands of kevlar for strength. The length of umbilical 18 can vary to allow for the cutting and retrieval of trees 10 submerged in water of different depths. Again, it will be appreciated that the length of umbilical 18 can be modified within the inventive scope herein.

Figure 42:
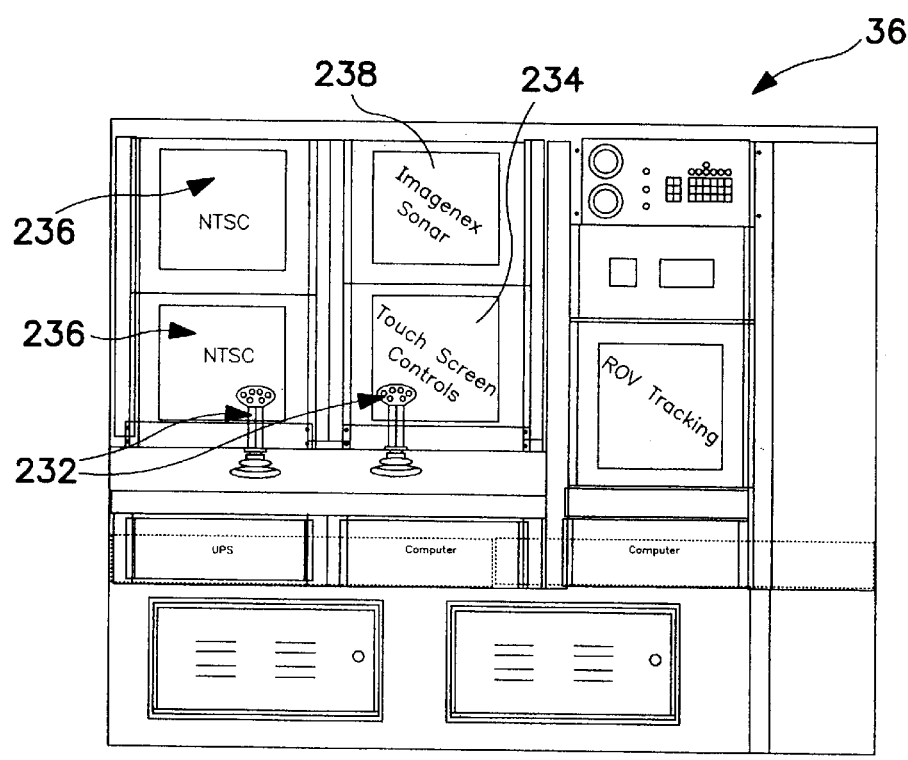
FIG. 42 is a schematic view showing a possible layout of the control unit.

FIG. 42 illustrates schematically one possible layout of control unit 36. As indicated above, control unit 36 contains all control and power distribution equipment required to steer and operate underwater vessel 16. In the illustrated embodiment, control unit 36 comprises two joy sticks 232 each having three axis controls and six buttons per hand. Joy sticks 232 control the operation of thrusters 30–34 and hence the position of underwater vessel 16. Control unit 36 also includes a touch screen control 234 for controlling underwater vessel parameters. The position of underwater vessel 16 may be monitored by video monitors 236 and a sonar screen 238. An ROV tracking system capable of processing GPS signals may also be provided and may be monitored as secondary screen on the sonar system.

As will be appreciated by a person skilled in the art, control unit 36 may also optionally include an autopilot to control steering functions such as the depth and heading of underwater vessel 16. In autopilot mode control unit 36 uses feedback from sensors such as a gyro-compass, depth sensor and echo sounder. An onboard computer processes the sensor information and transmits signals to open and close electro hydraulic servos, thereby controlling thrusters 30–34 to adjust the depth, altitude, heading and speed of underwater vessel 16.

Figure 43:
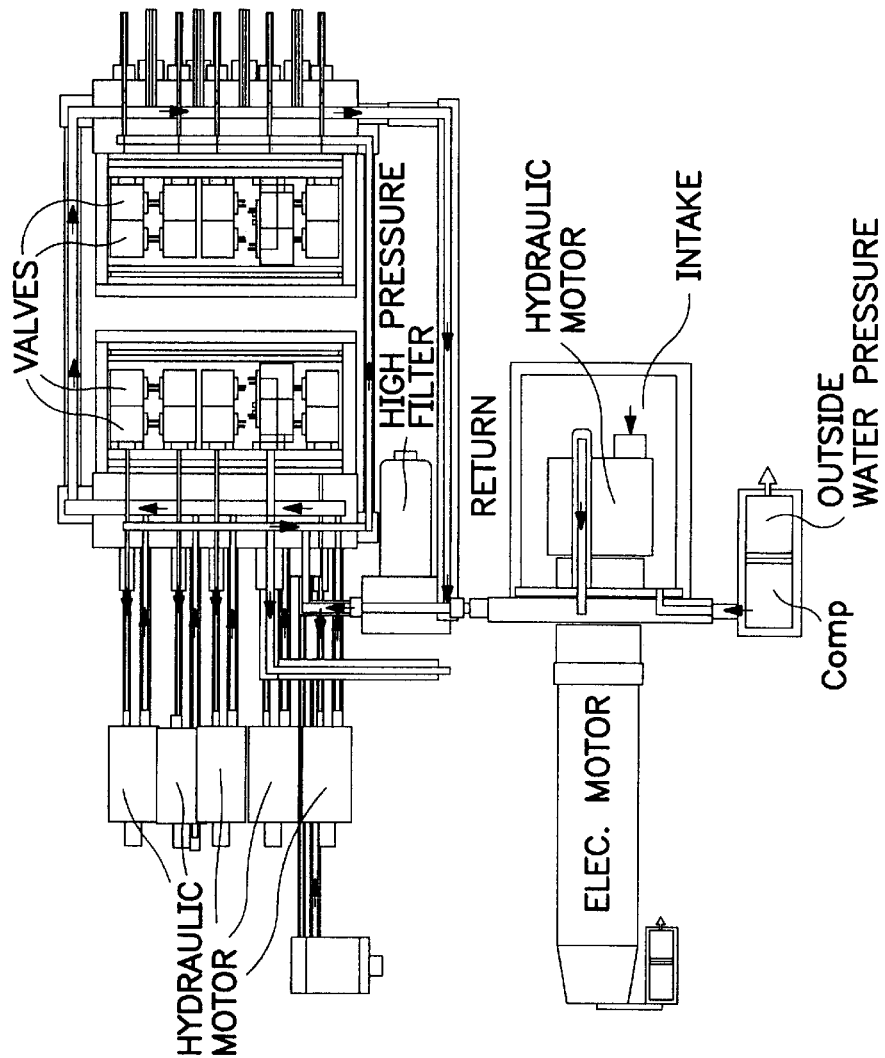
FIG. 43 is a schematic view of the hydraulic system of the invention.

FIG. 43 is a schematic view of one possible layout of the hydraulic system of the invention comprising a plurality of integrated motors and valves. As will be appreciated by a person skilled in the art, the hydraulic an air supply systems may vary without departing from the invention.

Operation

In operation, underwater vessel 16 and control unit 36 may be conveniently transported to an underwater logging site by flatbed truck, water craft, helicopter or the like. Control unit is positioned on a surface vessel 14, such as a floating barge or large boat, at the logging site and is connected to underwater vessel 16 by umbilical 18.

A plurality of air bag cylinders 68 are loaded into magazine 70 of underwater vessel 16 prior to its deployment in the body of water in question. Each cylinder 68 includes a folded air bag 24 clamped to a cartridge 82 and contained with a tubular housing 88. Preferably the buoyancy of upper section 94 of housing 88 is preset to suit the local conditions of the logging site. For example, the preferred buoyancy setting may depend upon the elevation of the logging site and local water conditions. The buoyancy of upper section 94 is adjusted as described above by filling section 94 with an appropriate amount of air or foam through access aperture 93 and inserting plug 95 (FIG. 29).

Cylinders 68 are loaded into magazine 70 through side access door 105 (FIG. 2). In particular, cartridge 82 of each cylinder 68 is coupled to a respective magazine T-rail 78 so that cylinders 68 extend in a vertical orientation. Each cartridge 82 is loaded by manually spreading apart cartridge base portions 98, 100 against the bias of springs 106 to straddle a respective T-rail 78. Once cartridge 82 is in the desired position, the spreading force is released and cartridge 82 snaps securely into place. In the illustrated embodiment, up to 40 air bag cylinders 68 may be loaded into magazine 70.

Once underwater vessel 16 is fully loaded with cylinders 68 and access door 105 is closed, vessel 16 may be lowered into the body of water in question, such as by securing a crane to lifting bar 37. In operation, underwater vessel 16 is maneuvered by a remote operator located in control unit 36 on surface vessel 14 to cut and retrieve submerged trees 10. The operator can view the position of underwater vessel 16 in control unit 36 via video monitors 236 which receive video signals from cameras 38 mounted on underwater vessel 16 (for example, at the front end thereof). Lights 40 mounted on vessel 16 provide illumination, enhancing visibility. Underwater vessel 16 is typically positioned just slightly above the bottom surface of the body of water. This will result in saw 20 cutting tree 10a just above bottom surface, maximizing the amount of wood recovered per tree 10b and minimizing the size of tree stump 10c. In the case of very large trees it may be necessary to saw each tree in two or more segments. It is advantageous for underwater vessel 16 to avoid coming into contact with the bottom surface since this may cause silt disruption, thus impairing the quality of the video images recorded by cameras 38. In the event of this happening, the operator does have the benefit of viewing position data derived from sonar 42 on control unit sonar screen 238. Video and sonar data is fed to control unit 36 by umbilical 18.

Underwater vessel 16 is maneuvered as described above through the operator's remote manipulation of thrusters 30–34. In order to initiate a cutting operation, underwater vessel 16 is positioned so that a submerged tree 10a is directly in front of it. Grapple assembly 44, located at the front end of vessel 16, is then controlled to engage tree 10a. In particular, vessel 16 is propelled forwardly until the concave front surface 52 of grapple frame 46 contacts tree 10a. Hydraulic rams 62 are then actuated by the remote operator to cause curved grapple arms 58, 60 to pivot inwardly to securely embrace tree 10a (FIG. 6).

Once tree 10a is engaged as described above, the air bag deployment and inflation assembly 150 located at the front end of vessel 16 is controlled to secure an air bag 24 to tree 10a. The first step in the air bag deployment procedure is to transfer an air bag cylinder 68 from magazine track 72 to ejection track 152. This is accomplished by actuating indexer 81 to advance an air bag cylinder 68 to the ready position shown in FIG. 31 (if magazine 70 is fully loaded, a cylinder 68 may already be in such position). In the ready position the leading surface of cartridge 82 bears against vertical sidewall 166 (or support bar 216 in the case of the alternative embodiment shown in FIGS. 37–40).

The next step in the deployment procedure is to push cylinder 68 outwardly on to ejection track 152. As shown in FIG. 32, this is accomplished by actuating cartridge advancement assembly 176. Since magazine T-rail 78 and shuttle T-rail 162 are aligned, extension of advancement block 180 causes cartridge 82 (and hence the remainder of cylinder 68) to slide to a loading position on shuttle base 160. Advancement block 180 is then reciprocated inwardly to the retracted position. As explained above, shuttle T-rail 162 has an air inlet aperture 164 extending therethrough which is aligned with air inlet aperture 116 of cartridge 82 when cartridge 82 is loaded on shuttle base 160.

As shown best in FIGS. 32 and 35c and 35d, housing 88 is then ejected from cartridge 82 to expose air bag 24. This is accomplished by actuating hydraulic rods 208 (while air bag cylinder 68 remains in the loading position). When rods 208 are extended upwardly they engage tabs 93 projecting outwardly from intermediate section 92 of housing 88, thereby causing housing 88 to lift away from cartridge 82. Rods 208 are then returned to their retracted position. The ejected housing 88 is sufficiently buoyant to rise in the water, allowing the stowed, uninflated air bag to unravel. Housing 88 remains tethered to air bag 24 by lanyard 210 (FIGS. 35d–35i).

The next step in the deployment procedure is to cause shuttle assembly 158 to slide cylinder 68 from the loading position shown in FIG. 32 to the deployed position shown in FIG. 33. This is achieved by extension of hydraulic rods 174. In the deployed position shuttle base 160 is displaced forwardly into contact with submerged tree 10a approximately the same distance as the underlying grapple frame 46 (FIG. 3b).

Screw actuator assembly 186 is next moved forwardly into engagement with cartridge 82 while shuttle assembly 158 remains in the deployed position. As described above, sliding movement of screw actuator frame 188 is actuated by a hydraulic cylinder 198. Frame 188 carries a motor 200 for driving a tool 202. When frame 188 is slid forwardly as shown in FIG. 34, tool 202 engages fastener 122 preloaded within barrel 121 of cartridge 82. Tool 202 is then actuated to forcefully drive fastener 122 into tree 10a. The tail end of fastener 122 remains coupled to cartridge 82 by plug 124 (FIGS. 28a–28d). Screw actuator frame 188 is then retracted rearwardly to its stowed position within vessel recess 48.

The next step in the deployment procedure is to inflate air bag 24. A supply of compressed air is delivered from surface vessel 14 through air passageway 228 of umbilical 18 to underwater vessel 16. An air conduit (not shown) extends within vessel 16 from umbilical spout 226 to air inlet aperture 164 formed in shuttle base 160. As indicated above, air inlet aperture 164 is aligned with air inlet aperture 116 of cartridge 82 when cartridge 82 is loaded on shuttle base 160. The air conduit includes a valve which can be opened and closed remotely by the operator to permit air flow out of the conduit through apertures 164 and 116 into cartridge 82. Air passes through the central borehole 118 formed in cartridge 82 into air bag 24 to inflate bag 24. This step is illustrated in FIG. 35i.

The operator views the progress of the inflation of air bag 24 through a via a video camera 38 and monitor 236 and closes the adjustable air valve when air bag 24 is filled. Shuttle assembly 158 is then returned to its original loading position upon the retraction of hydraulic rods 174 (FIG. 35i). In the case of the embodiment of FIG. 37, hydraulic rod 174 is extended against plate 220 to compress spring 222 and cause shuttle base 160 to slide rearwardly to the loading position. Cylinder 68, including inflated air bag 24, remains secured to tree 10a.

The operator may now actuate indexer 81 to advance the next-in-sequence air bag cylinder 68 around magazine track 72 into alignment with ejection track 152. Underwater vessel 16 and air bag cylinders 68 are designed to be "buoyancy neutral". This means that the ejection of one or more air bag cylinders 168 from vessel 16 as described above does not affect the buoyancy characteristics of vessel 16 (i.e. it will not rise or fall in the water when its propulsion system is inactive).

Figure 14:
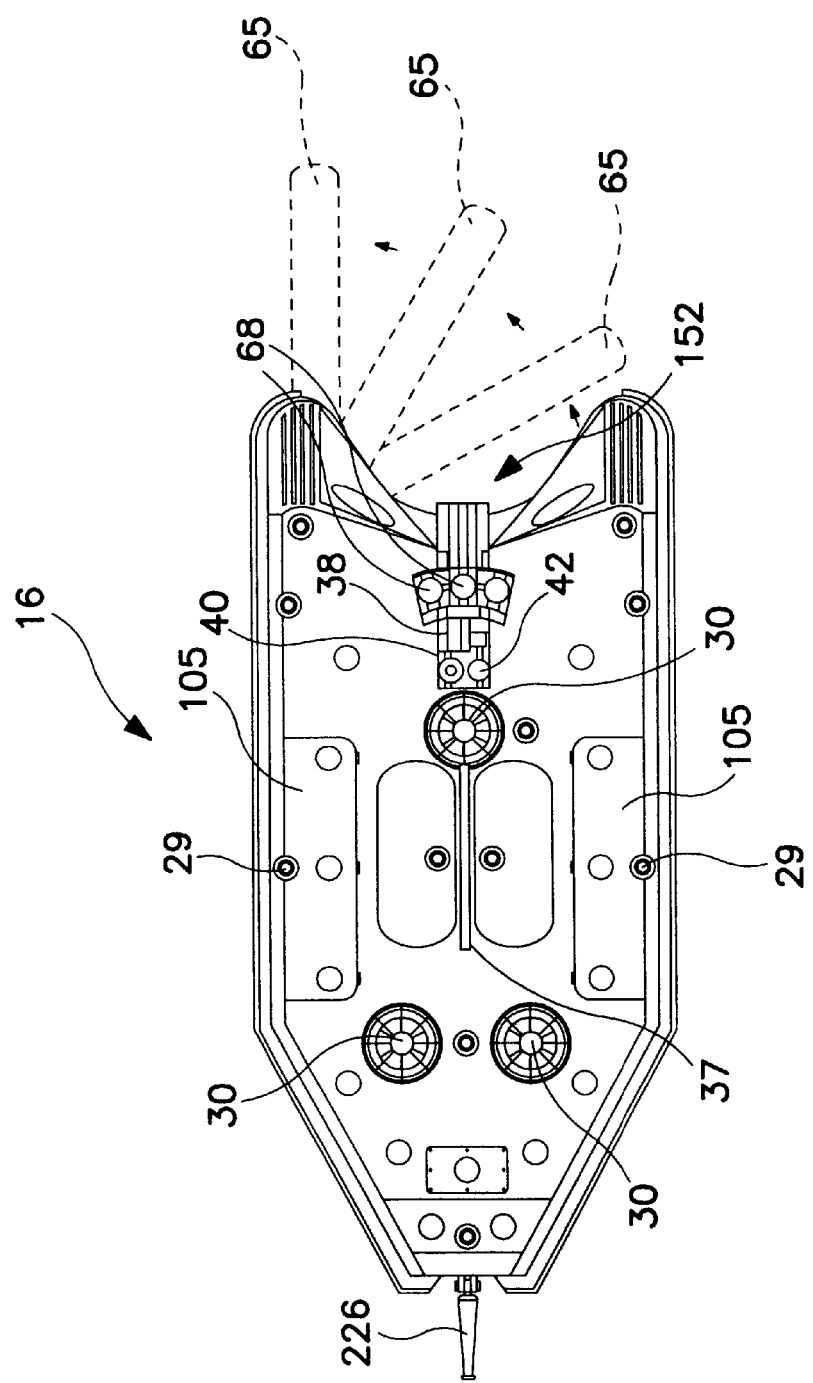
FIG. 14 is a top plan view of the underwater vessel showing the cutting path of the saw blade.

Following successful attachment of an air bag cylinder 68 to tree 10a, saw motor 64 and saw hydraulic ram 66 are then activated, causing saw blade 65 to follow the path illustrated in FIG. 14 above grapple assembly 44. This cutting operation, which is monitored by the operator by via a video camera 38 and monitor 236, results in a cut tree 10 and a stump 10c. The operator then retracts grapple hydraulic rams 62 causing grapple arms 58, 60 (and hence underwater vessel 16) to disengage tree 10b. The buoyancy of inflated air bag 24 lifts the cut tree 10 to water surface 22 where it can be collected by surface vessel 14, or alternatively another vessel in close proximity (FIG. 1). Since fastener barrel 121 rotatably couples cartridge 82 to tree 10, cartridge 82 can rotate 180° relative to fastener 122 to permit tree 10 to rise to water surface 22 butt end (i.e. sawn end) first.

At this point, underwater vessel 16 can be positioned to engage and cut another tree 10 in the manner described above. Alternatively, for some larger trees 10 it may be necessary to attach more than one air bag 24 to the tree 10 to effect the "lifting" force necessary to convey it to the water surface 22. If this is the case, underwater vessel 16 could be positioned on the opposite side of tree 10 to attach a second (or more) air bag(s) 24 to tree 10 prior to the cutting operation. Underwater vessel 16 may be maneuvered around a tree 10 to accomplish such "double bagging" by actuating aft lateral thruster 34.

As will be appreciated by a person skilled in the art, in alternative embodiments of the invention some or all of the various air bag deployment and inflation steps described above could be performed automatically rather than manually by the remote operator. For example, sensors could be provided for sensing the precise position of an air bag cylinder 68 on magazine track 72 and ejection track 152. Other sensors could detect, for example, the end of stroke of hydraulic rods 208 ejecting the cylinder housing 88, the contact of the shuttle base 160 with a tree 10a, the position of tree fastener 122, and the inflation of air bag 24. Sensor data could be processed by data processors in control unit 36 to cause automatic actuation of system components.

Figure 9:
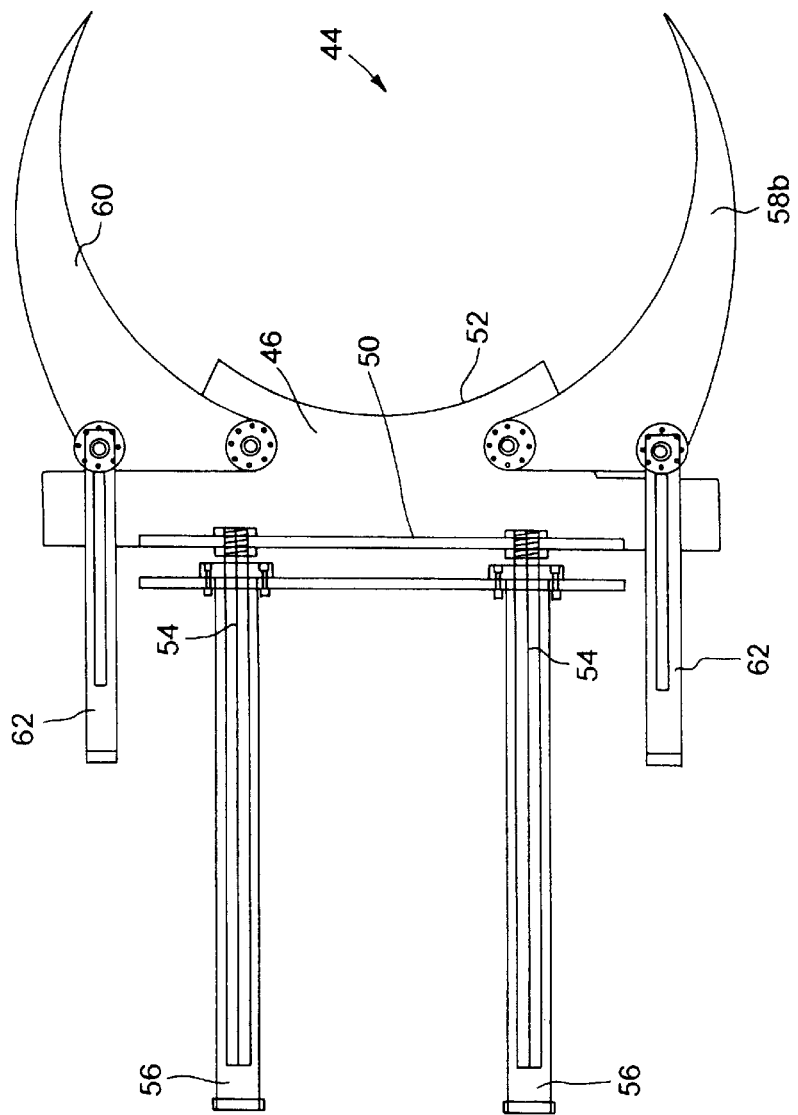
FIG. 9 is a further top plan view of the grapple assembly showing the dual extraction rams.
Figure 10:
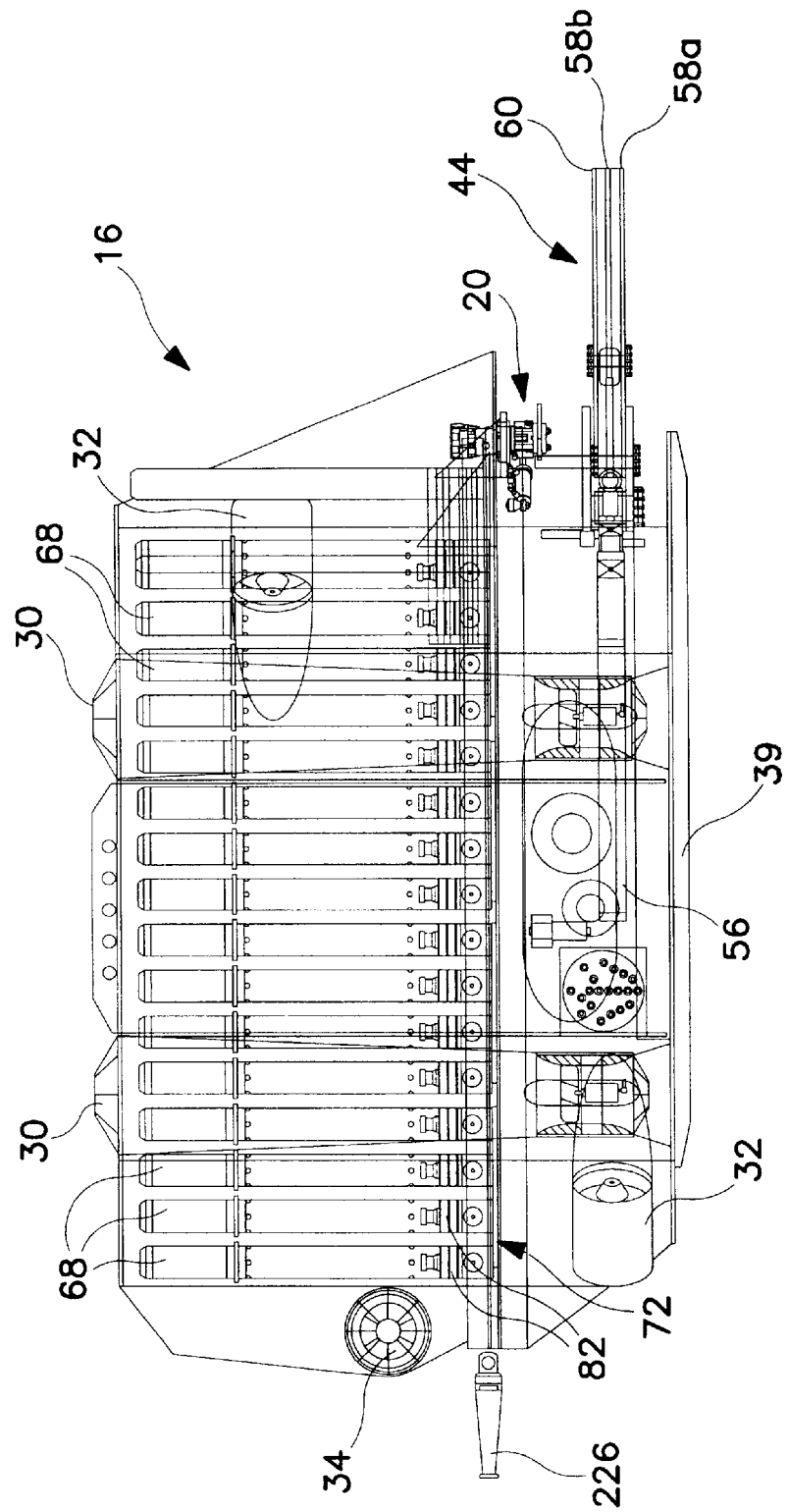
FIG. 10 is a side elevational view of the underwater vessel showing the position of the saw assembly mounted for pivotal movement above the grapple assembly.
Figure 11:
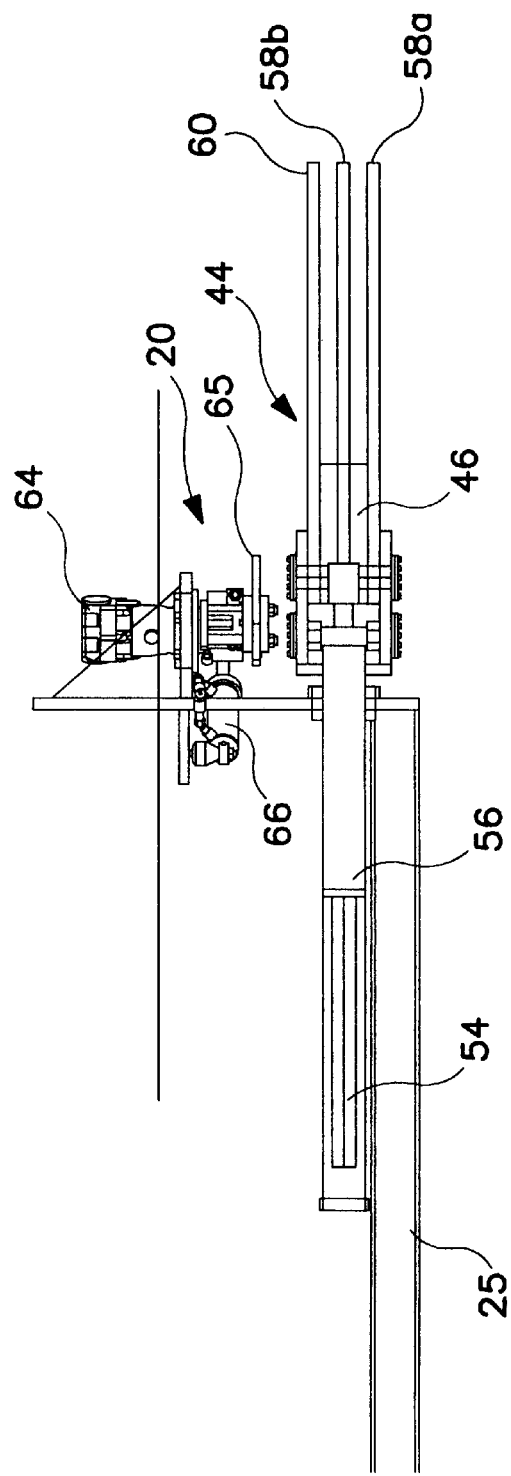
FIG. 11 is an enlarged, side elevational view of the saw assembly.

Occasionally blade 65 of saw 20 may become stuck in a tree 10a during a cut. While this problem can be addressed for conventional hand-held saws by manually repositioning the blade in various directions to pull it loose, it is not practical to do the same with a saw 20 mounted on underwater vessel 16 of the present invention. If saw 20 gets firmly caught in submerged tree 10a during a cut, it would be necessary for a diver to descend underwater to the logging site to manually remove the saw blade 65 from underwater vessel 16. This is time-consuming and inefficient and may be impossible to accomplish at certain depths. This problem is addressed in the present invention by providing dual hydraulic extraction rams 56 driving rods 54 (FIG. 9). Extension of rods 54 causes grapple assembly 44 to deliver a force sufficient to drive underwater vessel 16 away from tree 10a. As explained above, this in turn causes saw blade 65 to break off and remain lodged in tree 10a. Underwater vessel 16 may then be maneuvered back to the water surface 22 for installation of a replacement saw blade 65.

Extraction rods 54 may also optionally be extended in other circumstances where it is desirable to overweight the front portion of underwater vessel 16. For example, rods 54 may be extended when the operator wishes to tip the front end of vessel 16 downwardly to grapple sunken logs or the like located on the bottom surface of the body of water in question. In alternative embodiments of the invention, underwater vessel 16 may also be fitted with supplementary articulating arms (not shown) for engaging and moving water-logged trees, tree branches or other debris present at the logging site.

Once underwater vessel 16 has ejected all of its air bag cylinders 68, it is returned to surface vessel 14 and can be restocked with cylinders 68 collected from retrieved trees 10b. In particular, it is possible to reuse previously-used air bags 24, cartridges 82 and tubular housings 88. Air bags 24 are completely deflated (for example, by using a reverse air compressor) and refolded. Air bag housing 88 then fits over the folded air bag 24 and into snug engagement with cartridge 82. The reassembled air bag cylinders 68 may then be loaded into magazine 70 of underwater vessel 16 through side access door 105 as described above for use in another underwater logging session.

In a possible alternative embodiment of the invention, umbilical 18 may omitted and underwater vessel 16 may be operated by wireless remote control. However, this would require the use of sealed battery systems which increase the complexity and size of vessel 16. In a further alternative embodiment of the invention a fuel cell or fuel cell/battery hybrid could be used as the power source.

Throughout the following description specific details are set forth in order to provide a more thorough understanding of the invention. However, the invention may be practiced without these particulars. In other instances, well known elements have not been shown or described in detail to avoid unnecessarily obscuring the present invention. Accordingly, the specification and drawings are to be regarded in an illustrative, rather than a restrictive, sense.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An apparatus for cutting and retrieving trees submerged underneath the surface of a body of water comprising:
    (a) a control unit positionable on a surface vessel located on the surface of the body of water; and
    (b) an underwater vessel remotely controllable from said control unit, wherein said underwater vessel comprises:
        (i) a propulsion system for moving said underwater vessel underneath the surface of said body of water;
        (ii) a grapple for releasably engaging one of said trees;
        (iii) at least one inflatable bag attachable to one of said trees, said bag being adjustable between uninflated and inflated states;
        (iv) a gas supply for inflating said inflatable bag; and
        (v) a saw for cutting said trees.

2. The apparatus as defined in claim 1, further comprising an umbilical extending between said surface vessel and said underwater vessel.

3. The apparatus as defined in claim 2, further comprising a pressurized gas source located on said surface vessel and a gas conduit extending through said umbilical, wherein said gas supply is connected to said pressurized gas source by said conduit.

4. The apparatus of claim 1, wherein said underwater vessel is buoyancy neutral.

5. The apparatus as defined in claim 1, further comprising at least one cartridge having a gas inlet connectable to said gas supply, a gas outlet in communication with said inflatable bag, and a gas passageway extending between said inlet and said outlet.

6. The apparatus as defined in claim 5, wherein said inflatable bag is securely mounted on said cartridge.

7. The apparatus as defined in claim 6, further comprising at least one housing releasably connectable to said cartridge for containing said inflatable bag when said bag is in said uninflated state.

8. The apparatus as defined in claim 7, wherein said housing comprises a sealable chamber for containing a buoyant material, wherein the buoyancy of said sealable chamber is adjustable to alter the buoyancy characteristics of said housing.

9. The apparatus as defined in claim 8, further comprising a filament for tethering said housing to said bag.

10. The apparatus as defined in claim 6, further comprising a fastener rotatably coupled to said cartridge.

11. The apparatus as defined in claim 10, wherein said cartridge further comprises an internal cavity located within said cartridge for receiving said fastener and an external surface having an aperture formed therein, said fastener being moveable through said aperture for insertion into one of said trees.

12. The apparatus as defined in claim 11, wherein said internal cavity extends transversely through said cartridge and said gas passageway extends vertically through said cartridge.

13. The apparatus as defined in claim 1, comprising a plurality of said inflatable bags, each of said bags being movable between a storage position removed from said one of said trees and a deployed position proximate one of said trees.

14. The apparatus as defined in claim 13, further comprising a magazine within said underwater vessel for holding said inflatable bags in said storage position.

15. The apparatus as defined in claim 14, further comprising an ejection track for transferring each of said bags from said magazine to said deployed position.

16. The apparatus as defined in claim 15, wherein said magazine comprises:
(a) a track;
(b) a chain drive moveable around said track; and
(c) a plurality of magazine rails extending upwardly from said chain drive at spaced intervals.

17. The apparatus as defined in claim 16, further comprising a plurality of cartridges, each of said cartridges being securely connected to one of said inflatable bags, each of said cartridges having a gas inlet connectable to said gas supply, a gas outlet in communication with said one of said inflatable bags, and a gas passageway extending between said inlet and said outlet.

18. The apparatus as defined in claim 17, wherein said cartridges releasably couple said inflatable bags to said magazine, each of said cartridges having a slot formed in a base portion thereof for receiving one of said magazine rails.

19. The apparatus as defined in claim 18, wherein said base portion comprises first and second portions which are moveable relative to one another to vary the size of said slot.

20. The apparatus as defined in claim 18, further comprising a plurality of housings, each of said housings being releasably connectable to one of said cartridges for containing one of said inflatable bags in an uninflated state.

21. The apparatus as defined in claim 20, wherein said ejection track comprises a shuttle moveable between a loading position proximate said magazine and a deployed position proximate one of said trees, said shuttle having a shuttle rail alignable with one of said magazine rails to enable sliding movement of one of said cartridges from said magazine on to said shuttle in said loading position.

22. The apparatus as defined in claim 21, further comprising a cartridge advancement assembly for actuating sliding movement of said one of said cartridges on to said shuttle when said shuttle is in said loading position.

23. The apparatus as defined in claim 21, wherein said shuttle rail has an aperture extending therethrough which is alignable with said gas inlet of said one of said cartridges.

24. The apparatus as defined in claim 22, further comprising a shuttle actuator for actuating movement of said shuttle between said loading and deployed positions.

25. The apparatus as defined in claim 24, further comprising a housing ejector located proximate said ejection track for ejecting said one of said housings from one of said cartridges when said one of said cartridges is positioned on said shuttle.

26. The apparatus as defined in claim 25, wherein each of said cartridges further comprises a barrel for holding a tree fastener and wherein said apparatus further comprises a fastener driver for driving said tree fastener from said barrel into one of said trees when said shuttle is in said deployed position, wherein said tool is moveable above said ejection track between a disengaged position removed from said tree fastener and an engaged position engaging said tree fastener within said barrel.

27. The apparatus of claim 26, wherein said tool is slidably coupled to said shuttle actuator.

28. The apparatus as defined in claim 18, further comprising an indexer controllable from said control unit for advancing said chain drive around said track in predetermined increments.

29. The apparatus as defined in claim 15, wherein said ejection track is disposed above said saw at said front end of said underwater vessel.

30. The apparatus as defined in claim 1, wherein said grapple is disposed below said saw at a front end of said underwater vessel, said grapple comprising a central grapple frame and a pair of grapple arms each pivotably coupled to said frame, wherein said grapple arms are movable between an open position for receiving one of said trees therebetween and a closed position embracing said one of said trees.

31. The apparatus as defined in claim 30, further comprising an extraction ram for advancing said grapple frame forwardly between a retracted position and an extended position.

32. The apparatus as defined in claim 30, wherein said grapple frame as an outwardly concave outer surface.

33. An apparatus for cutting and retrieving trees submerged underneath the surface of a body of water comprising:
(a) a control unit positionable on a surface vessel located on the surface of the body of water; and
(b) an underwater vessel remotely controllable from said control unit, wherein said underwater vessel comprises:
(i) a tree holder for releasably engaging one of said trees;
(ii) a plurality of buoyant members sequentially ejectable from said underwater vessel, each of said members being attachable to one of said trees; and
(iii) a saw for cutting said trees.

34. The apparatus as defined in claim 33, further comprising a magazine within said underwater vessel for holding said buoyant members, wherein each of said buoyant members is movable between a storage position in said magazine and a deployed position proximate one of said trees.

35. The apparatus as defined in claim 34, further comprising an ejection track located at a front end of said underwater vessel above said saw for transferring each of said buoyant members from said storage position to said deployed position.

36. The apparatus as defined in claim 35, wherein each of said buoyant members comprises:
(a) a cartridge having a gas inlet, a gas outlet and a gas passageway extending between said inlet and outlet;
(b) a inflatable bag coupled to said cartridge for receiving gas discharged from said gas outlet, said bag being adjustable between inflated and uninflated states; and
(c) a housing releasably connectable to said cartridge for containing said inflatable bag in said uninflated state.

37. The apparatus as defined in claim 36, wherein said magazine comprises:
(a) a track;
(b) a chain drive moveable around said track; and
(c) a plurality of magazine rails extending upwardly from said chain drive at spaced intervals.

38. The apparatus as defined in claim 37, wherein each of said cartridges has a slot formed in a base portion thereof for receiving one of said magazine rails.

39. The apparatus as defined in claim 38, wherein said ejection track comprises a shuttle moveable between a loading position proximate said magazine and a deployed position proximate one of said trees, said shuttle having a shuttle rail alignable with one of said magazine rails to enable sliding movement of one of said cartridges from said magazine on to said shuttle in said loading position.

40. The apparatus as defined in claim 39, wherein said shuttle rail has an aperture extending therethrough which is alignable with said gas inlet of said one of said cartridges.

41. The apparatus as defined in claim 33, wherein said tree holder comprises a grapple assembly, said assembly comprising a central grapple frame and a pair of grapple arms each pivotably coupled to said frame, wherein said grapple arms are movable between an open position and a closed position embracing one of said trees.

42. A remotely controllable underwater vessel for use in a body of water comprising:
   (a) a propulsion system for moving the underwater vessel in the body of water;
   (b) a grapple for releasably engaging a tree submersed in the body of water;
   (c) at least one inflatable bag ejectable from said underwater vessel and attachable to said tree, said bag being adjustable between uninflated and inflated states;
   (d) a gas supply for inflating said inflatable bag; and
   (e) a saw for cutting said tree.

43. The underwater vessel as defined in claim 42 for use in cutting a plurality of trees submerged in said body of water, further comprising:
   (a) a magazine for holding a plurality of said inflatable bags; and
   (b) an ejection track located at a front end of said underwater vessel for sequentially moving said inflatable bags from said magazine to a deployed position proximate one of said plurality of trees.

44. The underwater vessel of claim 43, wherein said saw is disposed below said ejection track and said grapple is disposed below said saw.

45. The underwater vessel of claim 43, wherein said vessel is buoyancy neutral.

46. A method of cutting and retrieving a tree submerged underneath the surface of a water body comprising the steps of:
   (a) providing a remotely controlled underwater vessel, wherein said vessel carries at least one inflatable bag;
   (b) releasably engaging said underwater vessel to said tree;
   (c) fastening said inflatable bag to said tree;
   (d) inflating said inflatable bag;
   (e) cutting said tree at a location below said inflatable bag; and
   (f) disengaging said underwater vessel from said tree to allow said tree and said inflatable bag to rise together to the surface of the water body for retrieval.

47. The method as defined in claim 46, wherein the step of inflating said inflatable bag comprises delivering a supply of gas to said underwater vessel from a gas supply remote from said underwater vessel.

48. The method as defined in claim 47, wherein said underwater vessel is operatively coupled to a surface vessel located on the surface of the body of water and wherein the step of inflating the inflatable bag comprises delivering gas from a gas supply on the surface vessel to said underwater vessel.

49. The method as defined in claim 48, wherein said underwater vessel is connected to said surface vessel by an umbilical and wherein said gas is conveyed from said gas supply to said underwater vessel through said umbilical.

50. The method as defined in claim 46, wherein said underwater vessel comprises a saw and wherein the step of cutting said tree is performed by actuating operation of said saw.

51. The method as defined in claim 49, wherein steps (b)–(f) are remotely controlled by an operator on a surface vessel located on the surface of the body of water.

52. The method as defined in claim 51, wherein further comprising:
   (a) transmitting position signals from said underwater vessel to said surface vessel through said umbilical indicative of the position of said underwater vessel relative to said tree; and
   (b) processing said signals on said surface vessel to generate a visual display viewable by said operator showing said position of said underwater vessel.

53. The method as defined in claim 46, wherein said inflatable bag is secured to a cartridge and wherein the step of fastening said inflatable bag to said tree comprises driving a fastener through said cartridge into said tree.

54. The method as defined in claim 53, further comprising moving said inflatable bag on said underwater vessel from a storage position removed from said tree to a deployed position proximate said tree prior to fastening said inflatable bag to said tree.

55. The method as defined in claim 54, wherein said moving of said inflatable bag on said underwater vessel is remotely actuated by said operator on said surface vessel.

56. The method as defined in claim 46, further comprising fastening at least one other inflatable bag to said tree and inflating said other inflatable bag prior to cutting said tree.

57. The method as defined in claim 46, further comprising providing a housing connectable to said cartridge for containing said inflatable bag when said bag is in an uninflated state, wherein said method further comprises ejecting said housing from said cartridge prior to inflating said bag.

58. The method as defined in claim 46, wherein the discharge of said inflatable bag from said underwater vessel does not substantially alter the buoyancy characteristics of said underwater vessel.

59. The method as defined in claim 46, wherein said underwater vessel carries a plurality of said inflatable bags and wherein said inflatable bags are sequentially ejected from said underwater vessel during said fastening.

60. An inflatable bag assembly comprising:
   (a) a cartridge having a gas inlet, a gas outlet and a gas passageway extending between said inlet and outlet;
   (b) a inflatable bag coupled to said cartridge for receiving gas discharged from said gas outlet, said bag being adjustable between inflated and uninflated states;
   (c) a housing releasably connectable to said cartridge for containing said inflatable bag in said uninflated state; and
   (d) a barrel for holding a tree fastener, wherein said barrel is rotatably coupled to said cartridge.

61. The inflatable bag assembly as defined in claim 60, wherein said housing comprises a sealable chamber for containing a buoyant material, wherein the buoyancy of said sealable chamber is adjustable to alter the buoyancy characteristics of said assembly.

62. The inflatable bag assembly as defined in claim 60, further comprising a filament for tethering said housing to said bag.

63. The inflatable bag assembly as defined in claim 62, wherein said cartridge further comprises an external wall and an internal cavity located within said cartridge for receiving said barrel, said tree fastener being moveable through said external wall for insertion into a tree.

64. The inflatable bag assembly as defined in claim 63, wherein said internal cavity extends transversely through said cartridge and said gas passageway extends vertically through said cartridge.

* * * * *